US012812320B2

(12) United States Patent
Zhang et al.

(10) Patent No.: US 12,812,320 B2
(45) Date of Patent: Nov. 24, 2026

(54) SIGNAL PROCESSING METHOD AND APPARATUS FOR AUDIO RENDERING, AND ELECTRONIC DEVICE

(71) Applicant: Beijing Zitiao Network Technology Co., Ltd., Beijing (CN)

(72) Inventors: Zhengpu Zhang, Beijing (CN); Junjie Shi, Beijing (CN); Xuzhou Ye, Beijing (CN); Chuanzeng Huang, Beijing (CN); Derong Liu, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 137 days.

(21) Appl. No.: 18/589,337

(22) Filed: Feb. 27, 2024

(65) Prior Publication Data

US 2024/0214765 A1 Jun. 27, 2024

Related U.S. Application Data

(63) Continuation of application No. PCT/CN2022/115194, filed on Aug. 26, 2022.

(30) Foreign Application Priority Data

Aug. 27, 2021 (WO) ................ PCT/CN2021/115130

(51) Int. Cl.
*H04S 7/00* (2006.01)

(52) U.S. Cl.
CPC .............. *H04S 7/304* (2013.01); *H04S 7/307* (2013.01); *H04S 2400/11* (2013.01)

(58) Field of Classification Search
None
See application file for complete search history.

(56) References Cited

U.S. PATENT DOCUMENTS 9,025,775 B2 * 5/2015 Ojala .................... G10L 19/008 381/23
2005/0114121 A1 * 5/2005 Tsingos ..................... H04S 7/30 704/220

(Continued)

FOREIGN PATENT DOCUMENTS

CN 106465037 A 2/2017
CN 107510451 A 12/2017

(Continued)

OTHER PUBLICATIONS

International Search Report and Written Opinion for PCT/CN2022/115194, mailed Nov. 16, 2022, 13 pages.

(Continued)

*Primary Examiner* — Qin Zhu
(74) *Attorney, Agent, or Firm* — Astute IP Law Group

(57) ABSTRACT

The present disclosure relates to a signal processing method and apparatus for audio rendering, and an electronic device. The signal processing method for audio rendering comprises: acquiring a response signal set, the response signal set comprising response signals derived from sound signals, wherein the sound signals are signals received at a listening position; and on the basis of perceptual characteristics related to the response signals, processing the response signals in the response signal set to obtain response signals suitable for audio rendering, wherein the number of the response signals suitable for audio rendering is less than or equal to the number of the response signals in the response signal set.

19 Claims, 9 Drawing Sheets

(56) References Cited

U.S. PATENT DOCUMENTS

| | | | | |
|---|---|---|---|---|
| 2013/0022222 | A1* | 1/2013 | Zschau | G03H 1/2249 359/9 |
| 2015/0222994 | A1* | 8/2015 | Soulodre | H04R 5/02 381/300 |
| 2015/0373475 | A1 | 12/2015 | Raghuvanshi et al. | |
| 2016/0142844 | A1* | 5/2016 | Breebaart | G10L 19/008 381/23 |
| 2019/0182612 | A1* | 6/2019 | Chen | H04S 7/30 |
| 2019/0200159 | A1 | 6/2019 | Park et al. | |
| 2020/0120438 | A1* | 4/2020 | Kim | H04S 3/008 |
| 2021/0099795 | A1* | 4/2021 | Vilkamo | G10L 19/008 |
| 2021/0118454 | A1 | 4/2021 | Paulus et al. | |
| 2021/0383820 | A1* | 12/2021 | Herre | G10L 19/02 |
| 2023/0088922 | A1* | 3/2023 | De Bruijn | G06F 3/165 |
| 2023/0209300 | A1* | 6/2023 | Udesen | H04S 7/307 381/310 |

FOREIGN PATENT DOCUMENTS

| | | | | |
|---|---|---|---|---|
| CN | 110035376 | A | 7/2019 | |
| CN | 110915240 | A * | 3/2020 | H04S 7/304 |
| CN | 112153530 | A | 12/2020 | |
| CN | 112470102 | A | 3/2021 | |
| EP | 4346234 | A1 * | 4/2024 | H04S 7/302 |
| KR | 10-2019-0060464 | A | 6/2019 | |

OTHER PUBLICATIONS

Office Action for Chinese Patent Application No. 202280057718.7, mailed on Jul. 19, 2024, 14 pages.

Tianshi et al., "An improved method to render the sound of VR scene", Article, Opto-Electronic Engineering, vol. 45, No. 6, Jun. 8, 2018, 7 pages, with English abstract.

* cited by examiner

402

404

406

SIGNAL PROCESSING METHOD AND APPARATUS FOR AUDIO RENDERING, AND ELECTRONIC DEVICE

CROSS-REFERENCE OF RELATED APPLICATION

This application is a continuation of International Application No. PCT/CN2022/115194, filed on Aug. 26, 2022, which is based on and claims the benefit of an international patent application with application number PCT/CN2021/115130 filed on Aug. 27, 2021, the disclosures of both of the aforementioned applications are hereby incorporated into this disclosure by reference in their entireties.

FIELD OF THE INVENTION

The present disclosure relates to the technical field of audio signal processing, and in particular to a signal processing method, apparatus and electronic device for audio rendering, as well as non-transitory computer-readable storage media.

BACKGROUND

The realism of sound in 3D spatial audio is an important consideration in spatial audio, and sound rendering or audio rendering is also crucial for high-fidelity audio effects. Sound rendering or audio rendering refers to appropriate processing of sound signals from sound sources to provide users with desired listening experience in user application scenarios. Sound rendering or audio rendering can often be implemented by means of various appropriate acoustic models.

Currently, there are mainly two kinds of methods for modeling indoor room acoustics: one is modeling through wave acoustics. In the wave acoustics, wave equations are solved based on data, discretizing the space into smaller elements and modeling their interactions, it is computationally intensive and the load increases rapidly with frequency, so the methods for wave acoustics are more suitable for low frequency portions. The other is modeling through geometric acoustics. Geometric acoustics theory treats sound as rays and ignores fluctuation of sound. The propagation of sound is calculated through propagation of rays. The computation of geometric acoustics is also computationally intensive, it requires computation of a large number of rays and the energy of the rays to render the sound, however, geometric acoustics can more accurately simulate propagation paths of sounds in a physical space and the attenuation of energy, it can physically simulate spatial audio and achieve high-fidelity audio rendering effects.

DISCLOSURE OF THE INVENTION

According to some embodiments of the present disclosure, there is provided a signal processing apparatus for audio rendering, which includes an acquisition module configured to acquire a response signal set, the response signal set comprising response signals derived from sound signals, wherein the sound signals are signals received at a listening position; and a processing module configured to process the response signals in the response signal set on the basis of perceptual characteristics related to the response signals, to obtain response signals suitable for audio rendering, wherein the number of the response signals suitable for audio rendering is smaller than or equal to the number of the response signals in the response signal set.

According to some embodiments of the present disclosure, there is provided a signal processing method for audio rendering, which includes acquiring a response signal set, the response signal set comprising response signals derived from sound signals, wherein the sound signals are signals received at a listening position; and processing the response signals in the response signal set on the basis of perceptual characteristics related to the response signals, to obtain response signals suitable for audio rendering, wherein the number of the response signals suitable for audio rendering is smaller than or equal to the number of the response signals in the response signal set.

According to some embodiments of the present disclosure, there is provided an audio rendering apparatus, which includes a signal processing module as described herein, configured to process response signals derived from sound signals from a sound source to a listening position, and a rendering module configured to perform audio rendering based on the processed response signals.

According to some embodiments of the present disclosure, there is provided an audio rendering method, which includes processing response signals derived from sound signals from a sound source to a listening position, and performing audio rendering based on the processed response signals.

According to further embodiments of the present disclosure, there is provided a chip which includes at least one processor and an interface, wherein the interface is used for providing computer executable instructions for the at least one processor, and the at least one processor is used for executing the computer-executable instructions to implement the signal processing method for audio rendering or the audio rendering method in any embodiment as described herein.

According to further embodiments of the present disclosure, there is provided a computer program comprising instructions, which, when executed by a processor, cause the processor to implement the signal processing method for audio rendering or the audio rendering method in any embodiment as described herein.

According to further embodiments of the present disclosure, there is provided an electronic device, comprising: a memory, and a processor coupled to the memory, the processor is configured to implement the signal processing method for audio rendering or the audio rendering method in any embodiment as described herein based on instructions stored in the memory.

According to further embodiments of the present disclosure, there is provided a non-transitory computer-readable storage medium with a computer program stored thereon, wherein the program, when executed by a processor, causes implementation of the signal processing method for audio rendering or the audio rendering method in any embodiment as described herein.

According to further embodiments of the present disclosure, there is provided a computer program product comprising instructions which, when executed by a processor, cause the processor to implement the signal processing method for audio rendering or the audio rendering method in any embodiment as described herein.

Other features and advantages of the present disclosure will become apparent from the following detailed description of exemplary embodiments of the present disclosure with reference to the accompanying drawings.

DESCRIPTION OF THE DRAWINGS

The drawings described here are used to provide a further understanding of the present disclosure and constitute a part of the present application, the illustrative embodiments of the present disclosure and their descriptions are used to explain the present disclosure and do not constitute a limitation of the present disclosure. In the drawings.

DETAILED DESCRIPTION OF PREFERRED EMBODIMENTS

Figure 1A:
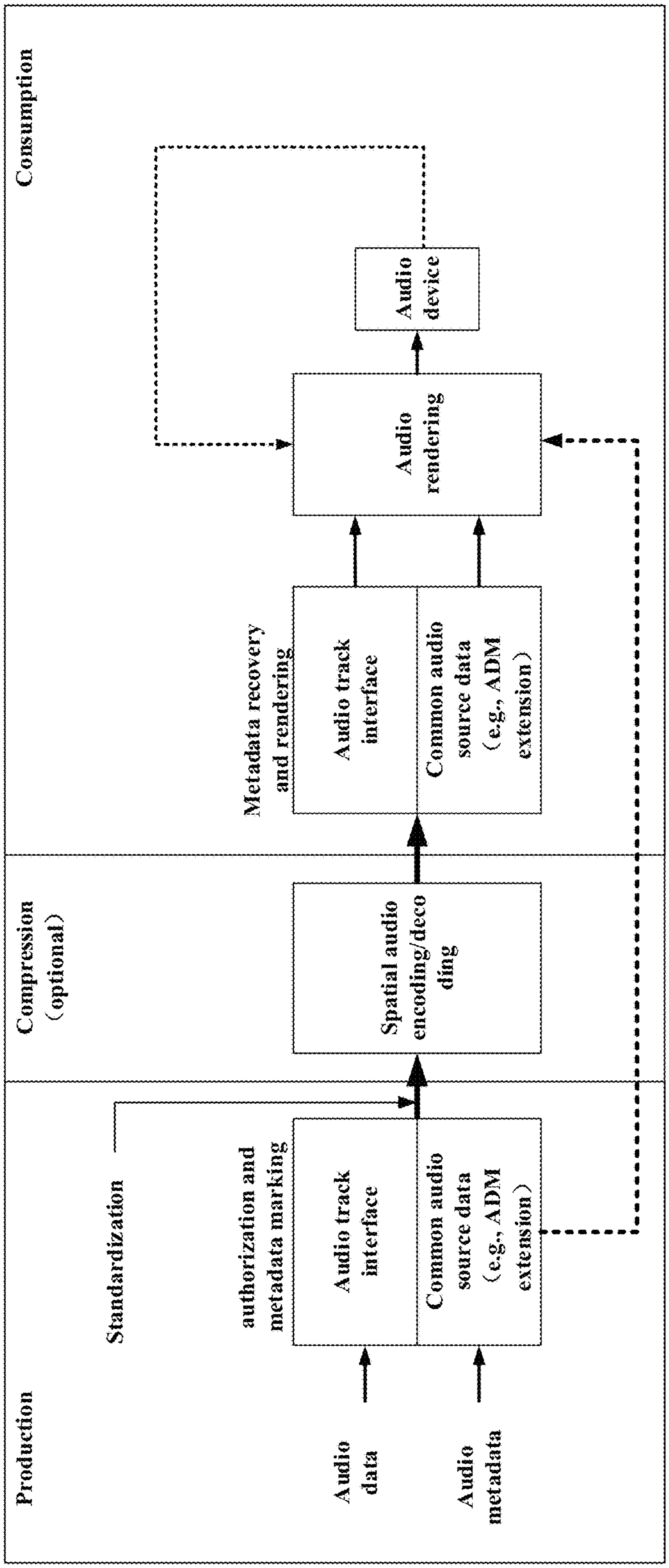
FIG. 1A shows a schematic diagram of some embodiments of an audio signal processing process.

The technical solutions in the embodiments of the present disclosure will be clearly and completely described below with reference to the accompanying drawings in the embodiments of the present disclosure, obviously, the described embodiments are only some of the embodiments of the present disclosure, rather than all of the embodiments. The following description of at least one exemplary embodiment is merely illustrative and is in no way intended to limit the disclosure, its application or uses. Based on the embodiments in this disclosure, all other embodiments obtained by those ordinary skilled in the art without making creative efforts fall within the protection scope of the present disclosure.

The relative arrangement of components and steps, numerical expressions, and numerical values set forth in these embodiments do not limit the scope of the disclosure, unless otherwise specifically stated. Meanwhile, it should be understood that, for convenience of description, the dimensions of various parts shown in the drawings are not drawn to actual scales. Techniques, methods and devices known to those ordinary skilled in the relevant art may not be discussed in detail, but where appropriate, such techniques, methods and devices should be considered a part of the authorized specification. In all examples shown and discussed herein, any specific values are to be construed as illustrative only and not as limiting. Accordingly, other examples of the exemplary embodiments may have different values. It should be noted that similar reference numerals and letters refer to similar items in the following figures, so that once an item is defined in one figure, it does not need further discussion in subsequent figures.

Some embodiments of an audio signal processing process are described below with reference to FIG. 1A, which particularly illustrates the implementation of various stages of an exemplary audio rendering process/system, exemplarily including a production stage or generation stage, and a consumption stage, and optionally, an intermediate processing stage such as a compression stage is also included.

In the production stage or generation stage, input audio data and audio metadata can be received, and the audio data and audio metadata are processed, especially authorization and metadata marking, to obtain production results. In some embodiments, for example, the input of audio processing may include, but not limited to, target-based audio signals, FOA (First Order Ambisonics), HOA (Higher-Order Ambisonics), stereo, surround sound, etc. In some embodiments, audio data is input to an audio track interface for processing, and audio metadata is processed via common audio source data (such as ADM extension, etc.). Optionally, standardization can also be carried out, especially for the results obtained by authorization and metadata marking.

In some embodiments, in the audio content production process, the creator also needs to be able to monitor and modify the work in time. As an example, an audio rendering system can be provided to provide the monitoring function of the scene. In addition, in order for consumers to obtain the artistic intention that the creator wants to express, the rendering system provided for the creator to perform monitoring should be the same as the rendering system provided for consumers to ensure a consistent experience.

Optionally, according to some embodiments of the present disclosure, after the captured audio signal is produced, and before it is provided to the consumption stage (which may include or be referred to as an audio rendering stage, for example), the audio signal may be subject to further intermediate processing. In some embodiments, the intermediate processing of the audio signal may include appropriate compression processing, including encoding/decoding. As an example, the produced audio content can be encoded/decoded to obtain a compression result, and then the compression result can be provided to the rendering side for rendering. Coding and decoding in compression can be realized by any suitable technology. In some other embodiments, intermediate processing of audio signals may include storage and distribution of audio signals. For example, audio signals can be stored and distributed in an appropriate format, for example, can be stored in an audio storage format and distributed in an audio distribution format, respectively. The audio storage format and audio distribution format can be of various appropriate forms, which will not described in detail herein.

It should be pointed out that the above-mentioned audio intermediate processing procedures, formats for storage, distribution, etc. are only exemplary and not restrictive. Audio intermediate processing can also include any other appropriate processing, and can also adopt any other appropriate format, as long as the processed audio signal can be effectively transmitted to the audio rendering end for rendering.

It should be pointed out that the audio transmission process also includes the transmission of metadata, the metadata can be of various appropriate forms and can be applied to all audio renderers/rendering systems, or can be correspondingly applied to each audio renderer/rendering system respectively. Such metadata may be called rendering-related metadata, and may include, for example, basic metadata and extended metadata, the basic metadata can be ADM basic metadata conforming to BS. 2076, for example. ADM metadata describing the audio format can be given in the form of XML (Extensible Markup Language). In some embodiments, metadata can be appropriately controlled, such as under hierarchical control.

Then, in the consumption stage, the audio signal transmitted from the audio production stage (and optionally, via the intermediate encoding and decoding processes) can be processed for playback/presentation to the user, in particular, the audio signal is rendered and presented to the user with a desired effect. In particular, the audio data and metadata can be recovered and rendered respectively, and then the processing results are be performed audio rendering processing and then input to the audio device. As an example, as shown in FIG. 1A, after the audio signal transmitted from the audio production stage (and optionally, via the intermediate encoding and decoding processes) are received, the audio track interface and general audio metadata (such as ADM extension) can be used for data and metadata recovery and rendering; audio rendering is performed on the results after metadata recovery and rendering, and the obtained results are input into an audio apparatus for consumption by consumers. As another example, if the audio signal representation is compressed in the intermediate stage, a corresponding decompression processing can be performed at the audio rendering end.

According to embodiments of the present disclosure, the processing of the audio rendering stage may include various appropriate types of audio rendering. In particular, for each type of audio representation, corresponding audio rendering processing can be adopted.

In some embodiments, the audio rendering process may employ scene-based audio rendering. Especially, in Scene-Based Audio (SBA), the rendering system is independent of the capture or creation of the sound scene. The rendering of a sound scene can be usually performed on a receiving apparatus, and a real or virtual speaker signal is generated. A vector speaker array signal $S=[S_1 \ldots . S_n]^T$ can be created as follows, where n represents the nth speakers.

$$S = D \cdot B,$$

where B is a vector of SBA signal $B=[B_{(0,0)} \ldots . B_{(n,m)}]^T$, n and m represent the order and degree of spherical harmonic function respectively, and D is the rendering matrix (also called decoding matrix) of the target speaker system.

In a more common scenario, an audio scene can be presented by playing back binaural signals through headphones. Binaural signals can be obtained by convolution of virtual loudspeaker signal S and binaural impulse response matrix $IR_{BIN}$ at the loudspeaker position:

$$SBIN = (D \cdot B) * IRBIN.$$

In an immersive application, it is desirable that the sound field rotates according to the motion of the head. Such rotation can be realized by multiplying a rotation matrix F by SBA signal B'=F·B.

In some embodiments, additionally or alternatively, the audio rendering process may employ channel-based audio rendering. The channel-based format is most widely applied in the conventional audio production. Each channel is associated with a corresponding speaker. The position of the speaker is standardized in ITU-R BS.2051 or MPEG CICP, for example. In some embodiments, in a scenario of immersive audio, each speaker channel can be rendered to headphones as a virtual sound source in the scene; in other words, the audio signal of each channel can be rendered to a correct position in a virtual listening room according to the standard. The most direct method is to filter the audio signal of each virtual sound source and the response function measured in a reference listening room. The acoustic response function can be measured by a microphone placed in the head and ear of a person or an artificial person. They are called binaural room impulse responses (BRIR).

In other aspects, additionally or alternatively, the processing in the audio rendering stage may include object-based audio rendering. In object-based audio rendering, each object sound source is independently presented along with its metadata, the metadata describes the spatial characteristics of each sound source, such as position, direction, width and so on. Using these characteristics, the sound source is rendered separately in the three-dimensional audio space around the listener. Rendering can be performed with respect to speaker arrays or headphones. In one example, speaker array rendering can use different types of speaker panning methods, such as vector-based amplification panning (VBAP), and the sound played by the speaker array can present the listener with a feeling that the object sound source is located at a specified position. In another example, there are also many different ways to render for headphones, such as using HRTF (Head-Related Transfer Function) in a corresponding direction of each sound source to directly filter the sound source signal. Alternatively, an indirect rendering method can be used to render the sound source to a virtual speaker array, and then perform binaural rendering for each virtual speaker.

It should be noted that the audio rendering process here may include or correspond to various appropriate processes performed in the rendering stage according to embodiments of the present disclosure, including but not limited to computation of reverberation, such as ARIR (Reverberant Room Impulse Response), BRIR (Binaural room impulse response), etc. In particular, for realistic spatial effects of 3D spatial audio, the effect of reverberation is crucial.

Figure 1B:
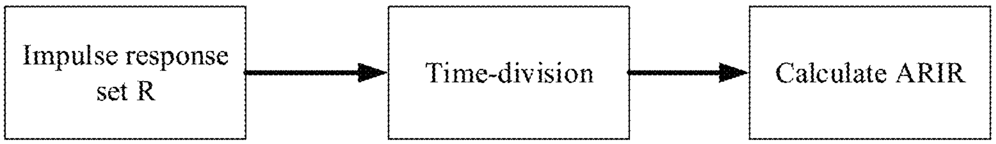
FIG. 1B shows a schematic diagram of a conventional audio signal rendering process.

FIG. 1B shows, for example, a conventional audio rendering process involving audio spatial reverberation, in which an impulse response set R from a sound source is first obtained, and then the impulse response set R is divided temporally, calculation based on the divided impulse response set R is performed to obtain the Reverberant Room Impulse Response (ARIR).

Spatial reverberation can be achieved by various appropriate methods, such as spatial reverberation based on geometric acoustics. In the calculation of spatial reverberation based on geometric acoustics, a sound ray tracing method is mainly used to simulate how a large number of sounds propagate in a geometric space and environment, and the impact/impulse response between the sound source and the listener is calculated through propagation of sound rays, and then sound ray signals are converted into the corresponding directional spatial impacts/impulse responses. By converting a large number of impacts/space impulse responses into binaural impact responses, the effect of late reverberation in a 3D space can be calculated. However, to obtain realistic spatial reverberation sound through sound ray tracking, it requires calculating a large number of spatial impulse responses and performing convolution operations, which are very time-consuming and computationally intensive for personal computers and mobile phones, therefore, it is very necessary to reduce the computational complexity and reduce the computation time consumption.

With respect to such problems, in some implementations, there has been proposed a multi-process and multi-thread method, that is, the computationally intensive and computationally complex parts can be allocated through high-level personal computers and mobile phones to other processes or threads for computation to reduce the computational load; and GPU and TPU computing methods, which are similar to the multi-threading methods, also allocate computationally intensive and computationally complex parts to high-level hardware and peripherals for computation, thereby improving computing performance. However, it can be seen from the above that in order to solve the problem of intensive and complex computation in the process of calculating late-stage reverberation through the sound ray tracking algorithm, these optimization methods mainly use the performances of hardware to solve this problem. This hardware-dependent method cannot effectively solve computationally intensive and time-consuming problems, especially for application scenarios with low hardware performance (such as mid- to low-level personal computers or mobile devices).

In view of this, the present disclosure proposes an improved technical solution to optimize signal processing in audio rendering, especially signal processing for reverberation processing in audio rendering. In particular, the present disclosure proposes optimizing a response signal set derived from sound signals originating from a sound source to obtain an optimized response signal suitable for audio rendering, especially a relatively small number of response signals, so that the computational complexity can be reduced and the computational efficiency can be improved. In this way, a real spatial audio experience can be obtained for application scenarios with low hardware performance, especially low-level personal computers or mobile devices.

Figure 2A:
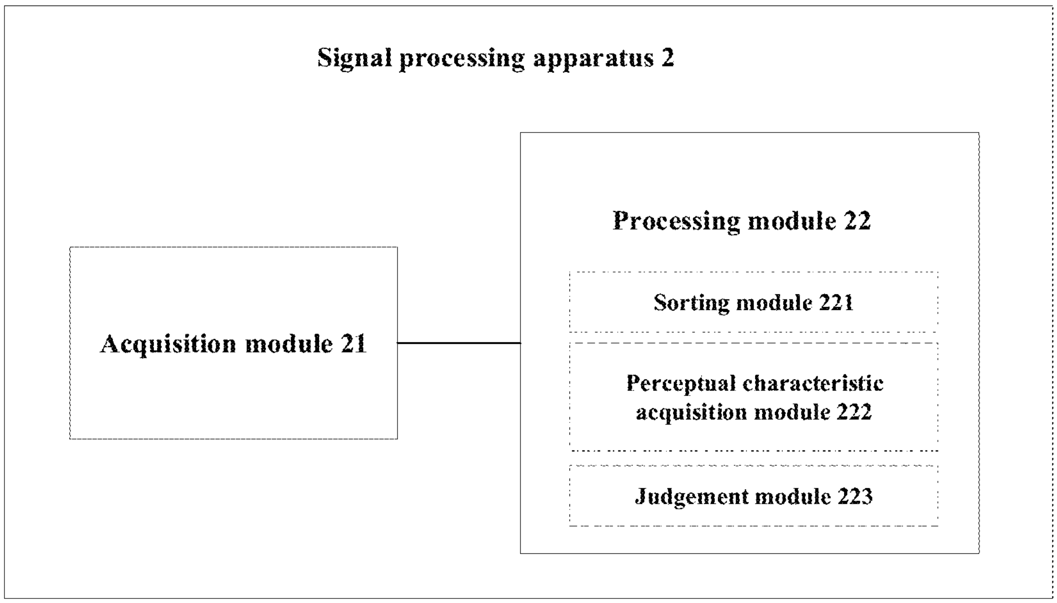
FIG. 2A shows a block diagram of a signal processing apparatus for audio rendering according to some embodiments of the present disclosure.

FIG. 2A shows a block diagram of a signal processing apparatus for audio rendering according to an embodiment of the present disclosure. The signal processing apparatus 2 includes an acquisition module 21 configured to acquire a response signal set, the response signal set comprising response signals derived from sound signals, wherein the sound signals are signals received at a listening position; and a processing module 22 configured to process the response signals in the response signal set on the basis of perceptual characteristics related to the response signals, to obtain response signals suitable for audio rendering, wherein the number of the response signals suitable for audio rendering is smaller than or equal to the number of the response signals in the response signal set. In particular, by performing appropriate processing on the response signals, a smaller number of response signals suitable for audio rendering, especially reverberation calculation, can be obtained, thereby reducing the complexity in reverberation calculation and improving efficiency. This will be described in detail below.

According to embodiments of the present disclosure, sound signals received at the listening position may be from a sound source. In particular, sound signals from a sound source may include sound signals that propagate from the sound source to the listening position in various ways, such as sound signals propagating directly from the sound source to the listening position, sound signals propagating indirectly (e.g., via various reflection) from the sound source to the listening position. In some embodiments, a sound signal can be a sound signal in various appropriate forms, for example, it can include a sound ray signal, which can be obtained by simulating the propagation of sound in a geometric space and environment through a sound ray tracing method, especially such as the sound ray signal used in spatial reverberation calculation based on geometric acoustic theory.

According to embodiments of the present disclosure, the response signal may include various appropriate response signals converted from sound signals, such as impulse responses, impact responses, etc., especially spatial impulse responses to be utilized in the reverberation calculation based on geometric acoustic theory. In particular, the response signal may be indicative of a response signal obtained at the listening position from sounds from the sound source. Various suitable conversion methods can be used. In some embodiments, where the sound signal is a sound ray signal from a sound source to a listener, the impulse response may be a directional impulse response converted from the sound ray signal. The following description will take an impulse response as an example, where the response signal and the impulse response can be used interchangeably, and a response signal set will correspond to an impulse response set, which contains at least one impulse response or response signal. It should be noted that embodiments of the present disclosure are equally applicable to other types of response signals, as long as the response signals are convertible from sound signals and can be used for audio rendering, especially reverberation calculations.

According to some embodiments, the acquired impulse response set may include at least one impulse response, which may correspond to at least one sound signal arriving from the sound source to the listening position, the sound signal may include a direct signal, a reflection signal or the like from the sound source to the listening position, for example, a pulse signal may correspond to a sound signal. In one aspect, in some embodiments, the impulse response set may include an impulse response derived from a direct sound signal propagating directly from the sound source to the listening position. On the other hand, in some embodiments, the impulse response set may also include an impulse response derived from a reflected sound signal from the sound source to the listening position. In particular, the reflected sound signal may refer to the reflected signal after the sound signal emitted from the sound source is reflected on any object or reflective position in the listening space. Therefore, the impulse response set may include impulse responses corresponding to the sound signal from the sound source to the reflection position, and then from the reflection position to the listening position. According to some embodiments, the reflected sound signal is in particular a late reflected sound signal used for reverberation calculation. In particular, the late reflected sound signal may refer to a sound signal among the reflected signals that takes a longer time to arrive at the listening position from the sound source, for example, a sound signal that exceeds a specific time length; or a sound signal that has undergone a greater number of reflections from the sound source, for example, a sound signal that exceeds a certain number of reflections.

According to embodiments of the present disclosure, the impulse response may be represented by appropriate information. In some embodiments, the impulse response can be represented by time information, sound intensity, sound spatial orientation information, etc. of the sound signal, where the time information can include any of the time-stamp, propagation time length, etc. from the sound source to the listening position. In some embodiments, the impulse response may be in various suitable formats, such as a vector format, and each element in the vector may correspond to information data used to represent the impulse response, for example, may include time data elements, sound intensity elements, spatial direction elements, etc. In some embodiments, the acquired impulse response set may be in various suitable forms, such as a vector form, in which the respective corresponding data of all impulse responses are arranged in the form of a data string; or a matrix form, for example, the rows may correspond to respective impulse responses, the columns may indicate the corresponding data for each impulse response, and so on.

According to embodiments of the present disclosure, the impulse response set may be obtained in various appropriate ways. In some embodiments, the sound signal from the sound source to the listening position may be acquired or received by the signal processing apparatus, and the sound signal may be processed, such as appropriately converted, to obtain an impulse response set. In other embodiments, the sound signal from the sound source to the listening position can be acquired or received by other appropriate devices to generate an impulse response set and provide it to the signal processing apparatus.

According to an embodiment of the present disclosure, after acquiring the response signal set, the signal processing apparatus will process the response signal set, especially the response signals in the response signal set, to obtain response signals suitable for audio rendering. In particular, the response signals suitable for audio rendering may be derived from the response signal set and be smaller in number than initial response signals in the response signal set. In some embodiments, signal processing can be performed based on perceptual characteristics related to the response signals, thereby achieving reduction of response signals, reducing the number of response signals used for audio rendering, and reducing processing complexity.

According to some embodiments of the present disclosure, the perceptual characteristics related to the response signal may include characteristics related to the sound perception when the user listens to the sound corresponding to the response signal at the listening position, which may also be referred to as psychoacoustic perceptual characteristics, psychoauditory characteristics, or the like. The perceptual characteristics can contain a variety of appropriate information. In some embodiments, the perceptual characteristics may include perceptual data when the user listens to the sound at the listening position, particularly may include information or data related to at least one of auditory loudness of the sound signal, the mutual interference between the sound signals, the proximity between the sound signals, etc., the perceptual data can be calculated, for example, from the information carried by the perceptual signals, such as signal strength, signal spatial orientation information, signal time information, etc. of the perceptual signals. And it is possible to judge the perceptibility of the response signals based on such calculated perceptual data, for example, whether the perceptual data meets the perceptual requirements, especially whether it can be effectively perceived, can be judged by comparing the perceptual data with a specific threshold, thereby determining whether the sounds corresponding to the response signals can be effectively perceived.

In other embodiments, additionally or alternatively, the perceptual characteristics may include information related to perceptual situation, e.g., indicating the perceptual situation of the sound at the listening position, e.g., at least one of whether it is in an interaction situation (such as in particular a masking situation), whether it is in a situation that it cannot be perceived due to low sound pressure, or the like. As an example, the perceptual situation information may be indicated with corresponding bits, symbols, etc. For example, one bit can be used to indicate the perceptual situation information, where "1" can indicate that it can be perceived and is suitable for audio rendering, and "0" can indicate that it cannot be perceived, such as a masking situation or the situation that it cannot be perceived due to low sound pressure. As another example, one bit may be used to indicate the masking situation and one bit may be used to indicate the sound pressure situation, respectively. It should be noted that only when both bits are "1", the response signal is considered to be perceptible and suitable for audio rendering. Perceptual situation information can be obtained by comparing corresponding perception data with thresholds. As an example, this particularly corresponds to the following situation: the perceptual situation can be determined by other devices based on perceptual data and directly sent to the signal processing apparatus, so that the signal processing apparatus can more intuitively determine the perceptual situations of the signals and perform signal processing accordingly.

According to embodiments of the present disclosure, perceptual characteristics, in particular perceptual data and/or perceptual situation information, may be obtained in various suitable ways. In particular, perceptual characteristics can be obtained in particular for individual sound signals, in particular individual impulse responses. In some embodiments, it can be obtained by other appropriate devices and provided to the processing module, for example, it can be obtained by a device external to the signal processing apparatus, or a device or module in the signal processing apparatus but external to the processing module, and provided to the processing module. In other embodiments, the processing module itself can calculate individual sound signals, especially individual impulse responses, to obtain the perceptual characteristics of the signals, especially perceptual data.

In some embodiments, the above-mentioned perceptual characteristic acquisition may be performed especially by the perceptual characteristic acquisition module 222, the perceptual characteristic acquisition module 222 may acquire perceptual data based on the acquired information about the response signals or the sound signals, for example, perform operations based on the response signals or the sound signals to obtain perceptual data. Alternatively, the perceptual characteristic acquisition module 222 may acquire perceptual data from other apparatuses or devices, or directly acquire perceptual situation information.

According to embodiments of the present disclosure, based on the perceptual characteristics related to the response signals, it can be determined whether the perceptual requirements can be met when the user listens to the sounds corresponding to the response signals at the listening position, for example, whether the sounds can be effectively perceived. Here, the perceptual requirements may correspond to the situations or conditions that need to be met for the sound corresponding to the response signals being effectively perceived, such as non-masking situations, signal intensity conditions, etc., and may be in various appropriate forms. In particular, the above-mentioned process of determining whether the perceptual requirements are met may be performed by the determination module 223. In some embodiments, the perceptual requirement may correspond to a specific perceptual condition threshold, the perceptual data of the response signal in the response signal set may be compared with the specific threshold, and based on the comparison result, it may be judged whether the perceptual requirement is met. Additionally or alternatively, in other embodiments, the perceptual requirements may correspond to indication information of situations that are perceptible effectively (e.g., non-masking situations, situations where the signal sound pressure is sufficient to be perceived, etc.), and it is possible to judge whether the information related to the perceptual situation of the response signal in the response signal set is indication information of situations that are perceptible effectively. If so, it can be considered that the perceptual requirements are met, otherwise, it can be considered that the perceptual requirements cannot be met. As an example, it can be directly judged whether the information related to the perceptual situation is 1 or 0. If it is 0, it means the requirements cannot be met and the sound cannot be perceived effectively.

As a result, response signals that do not meet the perceptual requirements can be processed, for example, such response signals are not directly used for audio rendering, but are ignored, removed, merged, etc., so that compared with the obtained response signal set, the number of response signals applicable for audio rendering can be appropriately reduced, which can effectively reduce the computation amount and improve computational efficiency. In particular, considering that there will be multiple reflection signals, especially late reflection signals, at the listening position, such a computationally intensive problem will be relatively prominent, while in embodiments according to the present disclosure, by processing response signals, such as impulse responses, of the reflection signals, especially the late reflection signals, at the listening position, it is possible to achieve reduction of the impulse responses of the reflection signals for audio rendering.

An exemplary implementation of signal processing based on perceptual characteristics according to an embodiment of the present disclosure will be described below, in which an exemplary implementation using perceptual data contained in the perceptual characteristics is particularly described. However, it should be noted that the information related to perceptual situation contained in the perceptual characteristics can be applied similarly.

According to embodiments of the present disclosure, the perceptual characteristics related to response signal may include various types of perceptual characteristics, including but not limited to relative perceptual characteristics, which may also be referred to as first perceptual characteristics. The relative perceptual characteristics may relate to or indicate relative perceptual situation between response signals in the response signal set, such as masking situations, etc., in particular, the relative perceptual characteristics may include or indicate information related to masking situations. In this case, accordingly, the perceptual requirements may be the requirement related to corresponding perceptual characteristics, such as the requirement related to masking situation. For example, whether the perceptual requirement is met can be whether the masking situation is large, and when the masking situation is large, especially when it is greater than the masking requirement corresponding to the perceptual requirement, it can be considered that the perception requirement is not met. Otherwise, when the masking situation is small, especially when it is smaller than or equal to the masking requirement corresponding to the perceptual requirement, it can be considered that the perceptual requirement is met. In this way, it can be determined whether there exists masking in the response signals based on the relative perceptual characteristics between the response signals, and if it is determined that masking exists, signal processing can be performed, for example, reduction processing, for example, including at least one of ignoring, removing the masked signals, or merging the signals with masking situations can be performed. In this way, the response signals can be screened based on the masking situations, in particular, sound signals that are heavily influenced by mutual masking can be appropriately merged, so that the amount of data used for audio rendering processing can be appropriately reduced, so as to reduce the computation amount and improve computational efficiency.

It should be noted that the relative perceptual situation is not limited to the masking situation, it can also involve other mutual interference or mutual influence situations of the response information, and when the mutual interference or mutual influence of the response information is large enough to cause the sound to be unable to be accurately heard/perceived, it can be considered that the perceptual requirements cannot be met.

According to an embodiment of the present disclosure, the processing of the response signals may further include comparing relative perceptual characteristics between the signals, such as, in particular, relative perceptual data, with a specific threshold, which may be referred to as a mutual perception threshold, and based on the comparison result, determining whether the signals influence each other, especially whether they mask each other. In this way, when it is determined that mutual masking occurs, at least one of reduction processes such as ignoring, removing, and merging can be performed on the signals.

In some embodiments of the present disclosure, masking may involve or indicate masking between neighboring signals, and may be classified into different types of masking depending, on the signal proximity type. In particular, the masking may include at least one of temporal masking, spatial masking, frequency domain masking, and the like. For example, temporal masking can refer to masking between signals that are proximate in time, spatial masking can refer to masking between signals that are proximate in space, and frequency domain masking can refer to masking between signals that are close in frequency domain.

According to embodiments of the present disclosure, the relative perceptual characteristics between signals may involve proximity between signals, specifically including temporal proximity, spatial proximity, frequency domain proximity, and the like. In this way, the proximity between signals can be compared with a specific proximity threshold, which may be referred to as a first proximity threshold, and if the proximity is less than this threshold, the signals can be considered to be so proximate that masking may occur. For example, if the time difference between response signals is too small, for example, two response signals are very proximate in time, or the spatial distance between response signals that are adjacent in time is too small, for example, two response signals are very proximate in space, then it can be considered that masking may occur between such two response signals, which would influence each other in perception, so such two signals need to be processed, for example, merged, in order to eliminate the masking and achieve signal reduction.

In other embodiments, additionally or alternatively, whether the masking may exist may further rely on signal intensity relationships between response signals. For example, if the intensities of the response signals within a specific time period or a spatial range, e.g., an appropriate proximity range, significantly influence each other, for example, the sound intensity difference between the two response signals is very large, such as greater than a specific sound intensity threshold, it can be judged that there exists masking, and the masked signal can be either removed or merged with another signal to achieve signal reduction.

Figure 3A:
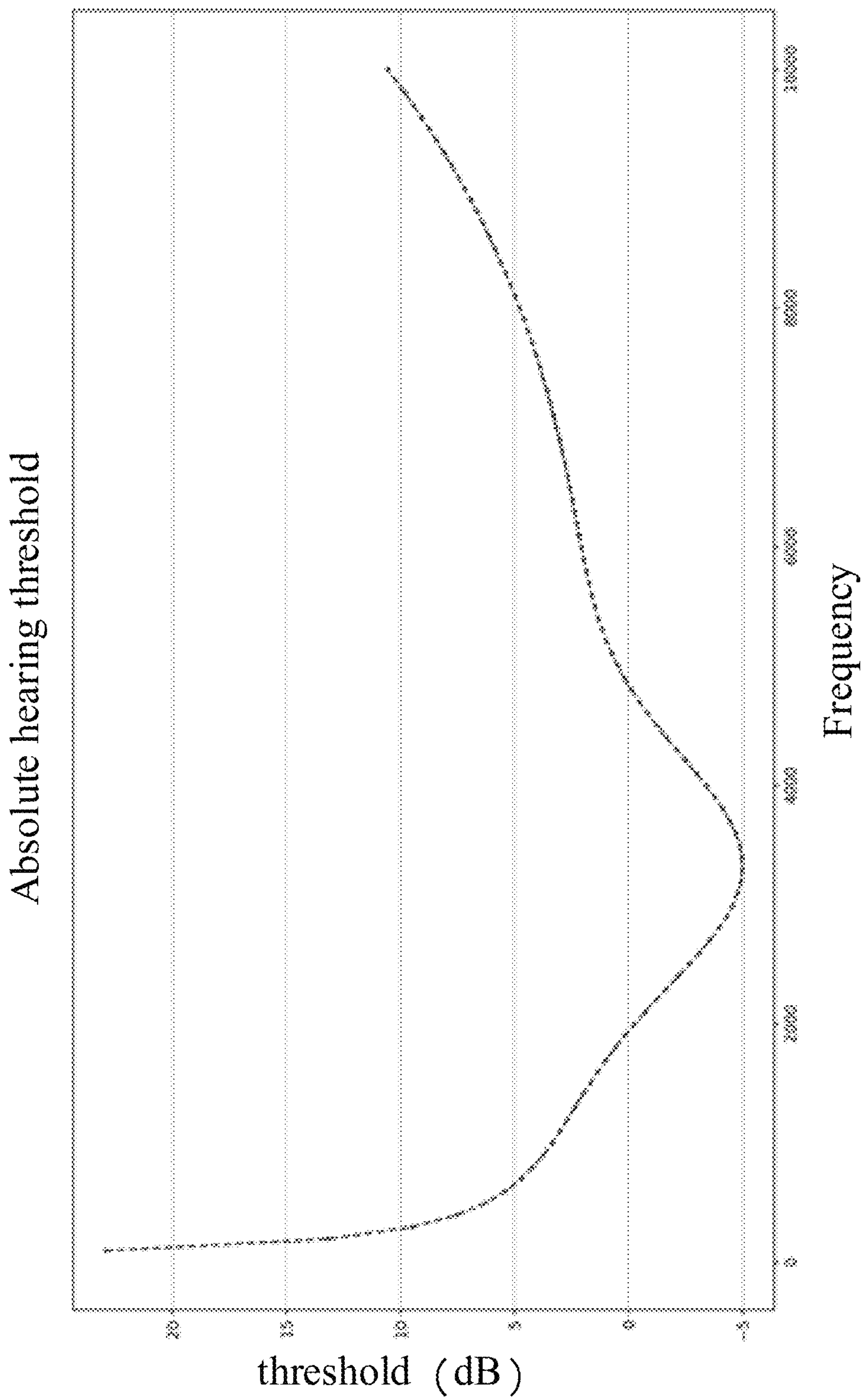
FIG. 3A illustrates an auditory threshold graph in accordance with some embodiments of the present disclosure.
Figure 3B:
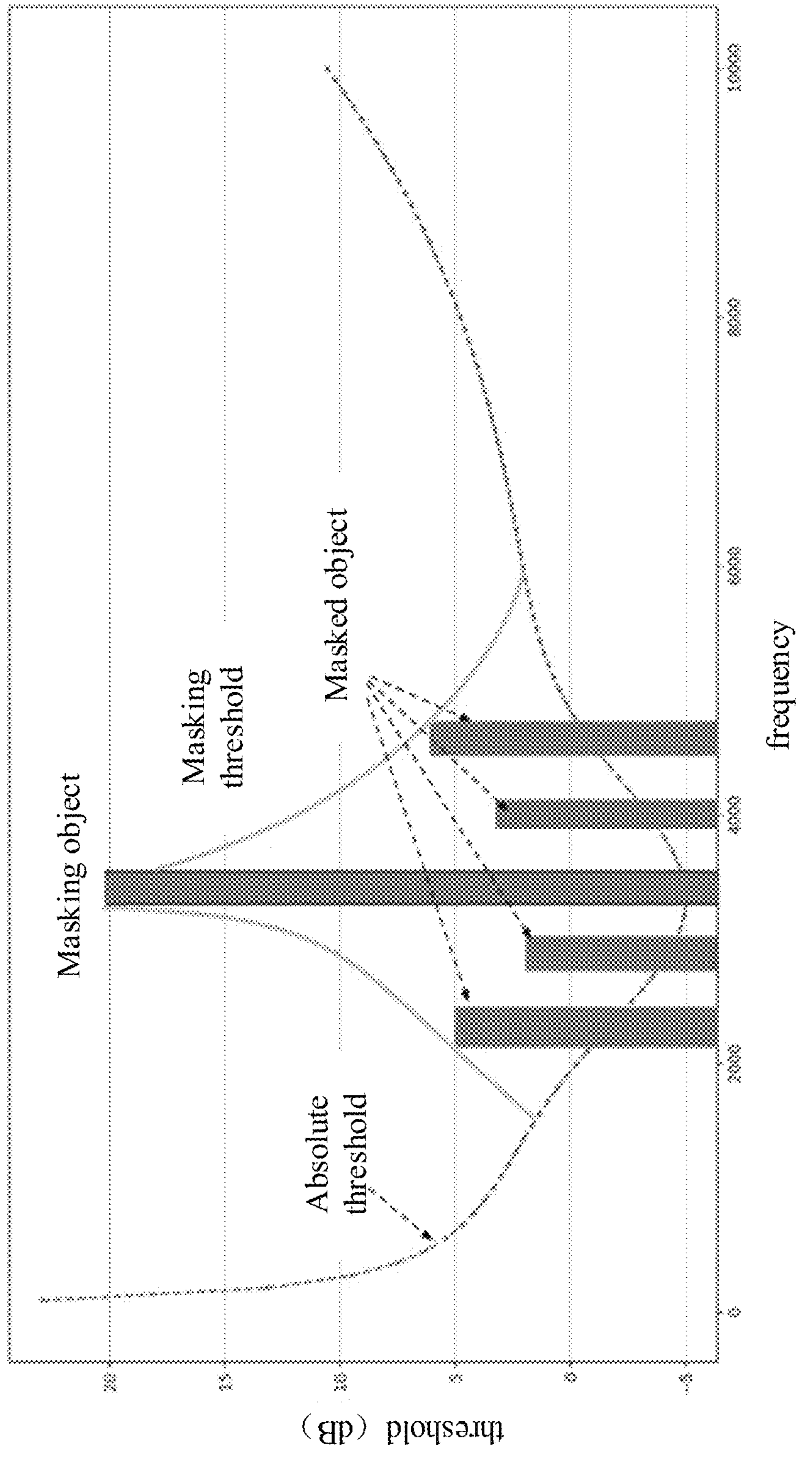
FIG. 3B shows a schematic diagram of the perceptual masking effect according to some embodiments of the present disclosure.

Specifically, when the user listens to the sound from a sound source at the listening position, perception of the sound by the human ears would be influenced by the masking effect. When sound A with a larger sound pressure acts on the human ears, if sound B also acts on the human ears at this time, the perception of sound B by the human auditory system in time and space will decrease, and the human ears will basically not be able to detect sounds below the masking threshold. At this time, a masking effect occurs. In particular, when the signal energy of the sound A that appears first exceeds a certain threshold, the low-energy signal B that appears later will be suppressed, and the masking effect will increase as the masking sound A increases, and it will also decrease as the masked sound B increases; when the signal B that appears later in the human ear's auditory perception is larger in energy than the signal A that appears first, backward masking will also occur, as shown in FIG. 3A.

In particular, according to embodiments of the present disclosure, neighboring signals may be determined first, and it can be determined whether there exists masking between neighboring signals based on mutual perception related data between neighboring signals, such as a value calculated based on at least one of spatial information, intensity information, etc. of the signals. The neighboring signals here may indicate signals within a specific time period or a spatial range, or signals between which the time difference or spatial difference is less than a specific threshold, the specific threshold here may be referred to as a second proximity threshold, which may generally be greater than or equal to the first proximity threshold, enables more accurate determination of the masking situation and more appropriate processing of the signals, especially merging processing.

According to some embodiments, the merging of impulse responses may be performed in various suitable ways. In some embodiments, merging may include performing mathematical statistics on at least one of attribute information of two impulse responses that are determined to be mutually masked, such as spatial information, time information, intensity information, etc., to obtain a new impulse response. As an example, mathematical statistics may be averaging, such as various suitable types of averaging calculations, such as spatial averaging, weighted averaging, and the like. For example, the merging of two impulse responses may include averaging the time information, spatial information and intensity information of respective impulse responses respectively, so that an impulse response calculated by the averaging can be obtained. As a further example, the mathematical statistics may be a mean of the spatial locations of the impulse responses or a weighted average of the spatial locations of the impulse responses, for example the weighted averaging may be performed based on the sound pressure levels/intensities of the impulse responses.

As an example, for two impulse responses where the temporal and/or spatial masking may occur, the merged impulse response can be expressed as follows:

$$\{r'_{t,s}\} = \begin{cases} (r_{t_1,s_1} + r_{t_2,s_2})/2, & \text{in temporal or spatial masking situation} \\ \{r_{t_1,s_1}, r_{t_2,s_2}\}, & \text{others} \end{cases}$$

Where $r_{t,s}$ can indicate an impulse response, $r_{t_1,s_1}$ can indicate the impulse response at a first time and a first spatial location, $r_{t_2,s_2}$ can indicate the impulse response at a second time and a second spatial location, where when the two impulse responses are temporally masked and/or spatially masked, they can be merged to obtain a new impulse response $r'_{t,s}$. The temporal masking situation can be represented by $t_2-t_1 \le \tau_T$, where $\tau_T$ represents a time threshold related to temporal masking; the spatial masking situation can be represented by $s_2-s_1 \le \tau_S$, where $\tau_S$ represents a spatial threshold related to spatial masking. It should be noted that the merging conditions here are only exemplary, and other exemplary masking conditions may also be used, such as the signal energy difference being greater than a specific energy threshold, the signal energy proportion being less than a specific threshold, etc.

An exemplary implementation of the processing performed by the signal processing module based on the relative perception characteristics according to the embodiment of the present disclosure will be described below.

According to some embodiments, the signal processing module may be configured to, for each impulse response in the impulse response set, determine proximity between the impulse response and each of other impulse responses in the impulse response set, including but not limited to at least one of temporal proximity, spatial proximity and frequency domain proximity, and the processing for impulse responses can be performed based on the proximity. In particular, when the proximity between two impulse responses is less than a certain threshold, such as the aforementioned first proximity threshold, it can be considered that the two impulse responses are too proximate and the masking may occur, so that the two signals can be appropriately processed, such as merging processing.

In particular, where the proximity is the temporal proximity, the time difference between the impulse responses can be determined, and where the time difference is less than a certain time threshold, such as the aforementioned first proximity threshold, it can be considered that there occurs masking for such two signals. As another example, where the proximity is the spatial proximity, the spatial distance between the impulse responses can be determined, and where the spatial distance is less than a certain spacing threshold, such as the aforementioned first proximity threshold, it can be considered that the masking occurs between such two signals. Here, the spatial distance between impulse responses may include information related to spatial interval, such as spatial angular interval. In some embodiments, the information related to spatial interval may relate to the spatial vector interval between the impulse responses. In some embodiments, the information related to spatial interval can be represented by statistical characteristics of the spatial vector intervals between the impulse responses, such as cosine value, sine values, etc.

According to some embodiments of the present disclosure, additionally or alternatively, mutual perceptual data between the response signals can be determined based on attribute information of the response signals, such as temporal information, spatial information, intensity information, etc., and then the response signals can be performed based on the mutual perceptual data, such as reduction processing as previously described. The mutual perceptual data here may mainly involve or indicate whether a masking situation will occur between the response signals, so it can also be referred to as masking situation related information.

According to some embodiments, the signal processing module may additionally or alternatively be configured to, for each impulse response in the impulse response set, determine a neighboring response set for the impulse response in the impulse response set, and then the neighboring response set is screened based on information about the masking situations between impulse responses. In particular, neighboring responses may refer to impulse responses that are adjacent in the temporal and/or spatial dimensions, and the neighboring response set for an impulse response is essentially a subset of the acquired impulse response set, which may refer to a subset of impulse responses within a specific time range and/or spatial range that includes the impulse response, or may include impulse responses whose temporal differences and/or spatial differences from the impulse response are less than a specific threshold. Here, the specific range or specific threshold may correspond to, for example, the aforementioned second proximity threshold.

In some embodiments, the temporally neighboring response set of the impulse response is essentially a subset of the acquired impulse response set, which may refer to an impulse response subset in a specific time range including the impulse response. For example, the impulse response to be calculated is an impulse response at 2.5 seconds, and its temporally neighboring response set may refer to an impulse response set within the time range between 2 seconds and 3 seconds. Alternatively, the neighboring response set may include an impulse response whose time difference from the impulse response is less than or equal to a certain time threshold, such as the above-mentioned second proximity threshold, which may correspond to 0.5 seconds, for example. The time range or threshold may be appropriately set, such as empirically. Preferably, the time range may correspond to a time difference between sound signals where mutual shielding may occur, and the time difference may be experimentally determined, empirically determined, or the like. The time value here can be the time point when the sound arrives at the listening position, or the propagation time length to the listening position, etc.

In some embodiments, for each impulse response, the acquired impulse response set may be traversed to determine whether each of the other impulse responses belongs to the temporally neighboring response set, for example, whether it is within the time range. Alternatively, for each pulse, the acquired impulse response set can be traversed to determine whether the time difference between each of the other impulse responses and the pulse is less than a specific threshold, such as the aforementioned second proximity threshold.

In particular, in order to facilitate the determination of the temporally neighboring response set for an impulse response, the impulse responses in the acquired impulse response set can be sorted temporally. In some embodiments, the processing module may include a sorting module 221 configured to sort the impulse responses in the acquired impulse response set, preferably temporally, for example, according to the times of arrival at the listening position from early to late, according to the propagation times of the impulse responses from short to long, and so on. It should be noted that other sorting manners are also possible, as long as they can be temporally sorted appropriately. The sorting of the impulse response set can further appropriately improve processing efficiency. As an example, for each impulse response, the judgement of neighboring response may be performed for only the previous one impulse response and the latter one impulse response. As another example, the judgement of neighboring response may be performed for only the impulse responses within a specific time range before and after the impulse response, or a specific number of impulse responses before and after the impulse response. In this way, there is no need to traverse the entire impulse response set, thereby reducing the computation amount of the judgment process and improving the processing efficiency. It should be noted that the sorting operation can be performed by other means/devices, and the sorted impulse responses can be input to the signal processing means.

According to an embodiment of the present disclosure, the signal processing module is configured to determine relative perceptual characteristics between every two impulse responses in the neighboring response set, which may be referred to as, for two impulse responses where the masking situation related information of the impulse response indicates the masking situation between the responses is large, such two impulse responses will be merged to create a new impulse response for the computation in audio rendering, otherwise the impulse response will be kept unchanged. An exemplary implementation of the computation and application of the masking situation related information is given below.

As an example, depending on the implementation of the masking situation-related information, when the masking situation-related information is greater than a certain threshold, the masking situation indicated by the masking situation-related information may be considered to be large. In this case, it can be considered that the perception requirement, especially the masking requirement included in the perception requirement, corresponds to a specific threshold, and that the perception requirement is met may correspond to being less than or equal to the specific threshold. For example, based on the neighboring response set $$R_{t,s}^{l},$$

the intervals between spatial vectors in the current set, such as a set of cosines of interval angles, can be calculated as the aforementioned masking situation-related information:

$$\{\zeta_{i,j}^{l}\} = \bigcup_{i=0}^{l}\bigcup_{\substack{j=0,\\ j\neq i}}^{l}\frac{\vec{r_i}\cdot\vec{r_j}}{|r_i||r_j|}$$

Among them, $\vec{r}_i$ and $\vec{r}_j$ represent vector representations of two responses in the neighboring response set $$R_{t,s}^{l},$$

the arrows added here indicate the direction, because each response has a directional coordinate value in space, which is equivalent to a vector, $|r_i|$, $|r_j|$ in the denominator respectively indicate the magnitudes of these two responses, for example, the sizes of vectors in a specific coordinate system, which may correspond to the distance of the sound from the listener or listening position. Thereby, the set of cosines between every two responses in the neighboring response set can be obtained.

Then, based on the set $$\{\zeta_{i,j}^{l}\}$$

and a spatial cosine threshold $\zeta_T$, which can also be referred to as a specific interval threshold, it is judged whether masking occurs. If masking occurs, a merge process is performed to generate a new set $$R'_{t,s}$$

$$r'_{t,s} = \begin{cases} \dfrac{\overrightarrow{r_{i,s}} + \overrightarrow{r_{j,s}}}{2}, & \zeta_{i,j}^{l} > \zeta_T \\ \{\overrightarrow{r_{i,s}}, \overrightarrow{r_{j,s}}\}, & \text{others} \end{cases}$$

In particular, each value in the set $$\{\xi_{i,j}^{l}\}$$

is compared with a specific threshold, and in a case that the value is greater than the threshold, i.e. the angular interval/spacing between the two responses in the set is small, which means that such two responses are too close, the two responses corresponding to the value in the set $$\{\xi_{i,j}^{l}\}$$

are merged, for example, the mean of the two impact responses is obtained, and it should be noted that other merging manners are also possible. For other cases, the two impact responses can remain. In this way, through merging, the impulse responses contained in the impulse response set can be reduced to obtain a new set.

Of course, the above is only exemplary, and other appropriate manners can also be employed to determine the spatial interval/distance between the response signals. As an example, depending on the implementation of the masking situation-related information, in a case that the masking situation-related information is less than a certain threshold, the masking situation indicated by the masking situation-related information may be considered to be large. For example, a set of sines of spatial vectors can be determined and when the spatial sinusoidal value is less than a certain threshold, also referred to as a specific interval threshold, which corresponds to a large masking situation, the merging can be performed. In this case, it can be considered that the perception requirement, especially the masking requirement included in the perception requirement, corresponds to a specific interval threshold, and that the perception requirement is met may correspond to being greater than the specific interval threshold.

In some embodiments, the masking situation-related information between every two impulse responses may be calculated sequentially starting from the first impulse response in the temporally neighboring response set, in particular, the masking situation-related information between the first impulse response and each of the other impulse responses may be calculated, and then the masking situation-related information between the second impulse response and each of the subsequent impulse responses is then calculated, thereby obtaining the masking situation-related information between all impulse responses in the neighboring response set. Then, each masking situation-related information is then compared to a specific threshold, and for two impulse responses where the masking situation-related information indicates that the masking situation is large, such two impulse responses will be merged to create a new impulse response for being used in the computation in audio rendering, otherwise the two impulse responses can remain unchanged.

In some embodiments, the masking situation-related information between every two impulse responses can be calculated sequentially starting from the first impulse response in the temporally neighboring response set, and the judgement is performed along with the computation of the masking situation-related information. That is to say, every time a piece of masking situation-related information is calculated, it is then judged whether the masking situation-related information indicates that the masking situation is large, if the masking situation is large, the merging process will be performed, and then the impulse response obtained by the merging can serve as the basis of subsequent masking situation-related information computation and judgment processing. Therefore, the amount of computation and judgment processing can be further reduced, and the time processing efficiency can be improved.

It should be noted that the above-mentioned masking situation-related information computation and judgment processing for a temporally neighboring response set can also be applied to a spatially neighboring response set.

In particular, the spatially neighboring response set of an impulse response can be acquired in a similar manner with that for the temporally neighboring response sets. The spatially neighboring response set of an impulse response may, for example, refer to a subset of impulse responses within a specific spatial range including the impulse response, or may be a collection composed of the impulse response and an impulse response whose spatial interval from the impulse response is less than a specific threshold. The spatial range or threshold may be appropriately set, for example determined experimentally, set empirically. Preferably, the spatial range can correspond to a spatial interval between sound signals where mutual shielding may occur, and the spatial interval may be determined experimentally, determined empirically, or the like.

In some embodiments, for each impulse response, the acquired impulse response set may be traversed to determine whether each of the other impulse responses belongs to the spatially neighboring response set, for example, whether it is within the spatial range. Alternatively, for each pulse, the acquired impulse response set can be traversed to determine whether the time difference between each of the other impulse responses and the pulse is less than a specific threshold, such as the aforementioned second proximity threshold.

In particular, in order to facilitate the determination of the spatially neighboring response set for an impulse response, the impulse responses in the acquired impulse response set can be sorted spatially. In some embodiments, the sorting module 221 may be further configured to sort the impulse responses in the acquired impulse response set, preferably according to spatial intervals, for example, according to spatial intervals between the impulse responses and a reference position in the listening environment from close to distant, spatial intervals between other impulse responses and a reference impulse response, which is a specific impulse response, from close to distant, and so on. In this way, for each impulse response, an impulse response in the sorting which is adjacent to the impulse response can be directly selected as the neighboring response set, for example, in a way similar to that for sorting pulses temporally, for each impulse response, an impulse response which is immediately close to the impulse response, or a specific number of adjacent impulse responses, or impulse responses in a specific spatial range, or an impulse response whose spatial interval from the impulse response, can be directly selected. In this way, there is no need to traverse the entire impulse response set, thereby reducing the computation amount of the judgment process and improving the processing efficiency.

Then, for the determined spatially neighboring response set, the information related to the masking situation between the response signals in the spatially neighboring response set can be determined, and a merging process can be performed when it is judged that the masking occurs, which can be performed as described above. As an example, the spatial proximity between response signals in the spatially neighboring response set can be determined, and in the case where the response signals are adjacent to each other, for example less than a certain threshold, such as the aforementioned first threshold, it can be considered that the masking occurs between the response signals, then the response signals which are judged as occurring the masking are processed.

In some embodiments, the above-mentioned computation and judgment processing of masking situation-related information for the temporally neighboring response set can be extended to the entire acquired impulse response set, so that impulse response screening can be performed on the entire acquired impulse response set.

Implementation of signal processing according to embodiments of the present disclosure, particularly for absolute perceptual characteristics, will be described below. According to some embodiments of the present disclosure, the absolute perceptual characteristics may involve auditory characteristics of the sound related to the response signal itself, especially perceptual intensity, such as absolute sound intensity, relative sound intensity, sound pressure, etc. In particular, the absolute perceptual characteristics may include information related to the intensity of the sound signal, particularly information related to the intensity of the impulse response. In some embodiments, the intensity-related information may be the sound pressure level of the frequency band or channel corresponding to the sound signal, especially the pulse signal. In other embodiments, the intensity-related information may be relative intensity information of the intensity of the sound signal (e.g., sound pressure) relative to a reference intensity (e.g., sound pressure), in particular corresponding to a hearing threshold.

As an example, whether the human ear can hear a sound depends on the frequency of the sound and whether the amplitude is higher than an absolute hearing threshold at this frequency, the absolute hearing threshold is a minimum intensity value at which the human ear can feel the sound, the hearing intensities of human ear for the sounds at different frequency bands are different, the hearing intensity, especially the hearing threshold, can correspond to an intensity of the sound that the human ear can appropriately perceive in this frequency band. The hearing threshold curve of the human ear is shown in FIG. 3A, when the intensity of a sound signal is lower than the absolute hearing threshold, the human ear cannot perceive the presence of sound. Therefore, such sound signal can be removed from the audio rendering process, and the computation amount can be reduced. Here, the hearing threshold may correspond to the aforementioned intensity-related information, and the absolute hearing threshold may correspond to the aforementioned intensity-related threshold.

According to embodiments of the present disclosure, additionally or alternatively, the absolute perception characteristic value of each response signal can also be compared with a specific threshold (which may also be referred to as a perception threshold, or an absolute perception threshold) to judge which sound signals are suitable for audio rendering, for example, sound signals above the specific threshold can be effectively perceived, while sound signals below the specific threshold cannot be effectively perceived and can be filtered out, thereby, the data amount used for audio rendering processing can be further reduced appropriately. In particular, for the acquired response signal set, especially the reduced response signal set acquired through the above embodiment, it can be judged whether the response signals therein will participate in the reverberation calculation based on the signal intensity attributes of the response signals, particularly, whether to participate in the convolution calculation for obtaining the binaural impulse response, so that the calculation of sound pressure level for each channel can be performed through the absolute psychological hearing threshold to reduce the complexity of the convolution-based binaural impulse response.

In some embodiments, the absolute perception characteristic corresponds to intensity-related information of the signal, and the signal processing module may be configured to compare the intensity-related information with a specific intensity-related threshold in signal processing, when the intensity-related information is lower than the specific intensity-related threshold (also known as a perceptual intensity threshold, or the absolute perceptual intensity threshold), the corresponding sound signal, especially the corresponding impulse response, can be removed without being used for audio rendering processing, which can effectively reduce computational burden of the audio rendering processing. In some embodiments, the intensity-related information can be represented in various appropriate forms, such as a sound intensity signal, a sound pressure signal, a relative value obtained based on a reference intensity signal, a relative value obtained based on a reference sound pressure signal, etc., and the intensity-related threshold can be a corresponding form of threshold. In other embodiments, the intensity related information can be determined in an appropriate manner, such as determined for a frequency band, determined for a channel, or the like.

As an example, for a loudness signal, the hearing-related relative intensity value for each channel is $$L_p = 20\log_{10}\left(\frac{p}{p_{ref}}\right)$$

Among them, p represents the sound pressure of the loudness signal, and $P_{ref}$ represents a reference sound pressure, which is defined as a minimum sound pressure at which a 1000 Hz sound signal is audible by young people with normal hearing at a room temperature of 25 °C, standard atmospheric pressure, which is 20 uP. Then, by comparing it with a standard absolute hearing threshold, it is judged whether the sound pressure of the current channel is within the audible range of the human ear, $$L_{audible} = \begin{cases} 1, L_p > \zeta_T \\ 0, L_p \leq \zeta_T \end{cases}$$

where, a corresponding sound signal with $L_{audible}$ equal to 1 is a sound that can be effectively perceived, and can be used for computation of impact response of the binaural room, that is, suitable for audio rendering processing. A corresponding sound signal with $L_{audible}$ equal to 0 is a sound that cannot be effectively perceived, so the corresponding response signal will be discarded or removed, without involving audio rendering or reverberation calculation. It should be noted that the above values of $L_{audible}$ are only exemplary, and they can also be other appropriate values, as long as the values can distinguish different situations as mentioned above.

It should be noted that the above calculation is only exemplary, and the intensity-related information can also be determined in other appropriate ways, such as based on frequency bands, based on time blocks, etc. In addition, screening based on intensity-related information can be performed in various other appropriate ways, for example, the intensity, sound pressure, etc. can be directly determined, and then the intensity is compared with an intensity threshold, or the sound pressure is compared with a sound pressure threshold to perform screening.

In some embodiments, the process may be performed on individual impulse responses in the acquired set of impulse responses. Among them, the intensity-related information is the sound pressure level of a frequency band corresponding to the impulse response contained in the impulse response set. In other embodiments, the process may be performed on blocks of impulse responses within the acquired impulse response set. Among them, an impulse response block may be an impulse response block obtained by time dividing the impulse response set. Among them, the intensity-related information is the sound pressure level of a frequency band corresponding to an impulse response block included in the impulse response set. In particular, each impulse response block may correspond to at least one frequency band, so that the sound pressure level may be obtained for each frequency band to which the impulse response block corresponds. Thus, when the sound pressure level of the impulse response is less than a certain threshold, the impulse response will be removed, instead of being used for calculations in the audio rendering. This can effectively reduce the amount of data used in audio rendering computation, reduce computational complexity and time-consuming, and improve computational efficiency.

According to embodiments of the present disclosure, signal processing can also utilize both relative perceptual characteristics and absolute perceptual characteristics at the same time, that is, using both intensity-related information and masking situation-related information to screen the impulse responses, thereby further reducing the amount of data used for audio rendering, thereby reduces computational complexity and workload and improves processing efficiency. In some embodiments, it is preferable to first perform appropriate processing, such as merging, retaining, ignoring, removing, etc., on the impulse responses according to the masking situation-related information, and then for the processed impulse responses, further screen individual impulse responses according to the signal intensity-related information, thereby further obtaining a reduced set of impulse responses. In other embodiments, for a given response signal set, it can screen individual impulse responses according to the signal intensity-related information to obtain a reduced set of impulse responses, and then for the reduced set of impulse responses, perform appropriate processing, such as merging, retaining, removing, ignoring, etc., on the impulse responses according to the masking situation-related information, thereby obtaining a further reduced set of impulse responses.

The above mainly describes the signal processing operations performed when the perceptual characteristics include perceptual data, including determining the perceptual situation (such as whether it is masked, whether it is insufficient to be perceived, etc.) and corresponding processing based on the determination results. It should be noted that signal processing operations may be similarly performed in a case where the perceptual characteristics contain information related to the perceptual situation. For example, the information related to the perceptual condition can be set by comparing the perceptual data with a threshold as described above. In particular, the perceptual situation can be determined by determining the value of the information related to the perceptual condition, and then corresponding processing is performed based on the determination result. For example, it can be judged whether the perceptual situation related information is 1 or 0, and if it is 0, the above-mentioned signal processing, such as merging, ignoring, removing, etc., can be performed.

According to embodiments of the present disclosure, after the response signals suitable for audio rendering are optimized, the response signals can be further processed, for example, block dividing, especially temporally block dividing, the response signal into blocks, and then performing audio rendering, such as calculating ARIR and optionally or additionally calculating BRIR, on the response signals after block division. The block division, ARIR or BRIR calculation, etc. here can be performed in various appropriate ways, such as various ways known in the art, and will not be described in detail here.

In particular, signal processing according to embodiments of the present disclosure may be applied to audio rendering processing in an appropriate manner. In particular, the signal processing can be applied to audio rendering processing centralizedly or decentralizedly. In particular, compared with the conventional signal processing process as shown in FIG. 1, some modules are newly added to optimize the signal processing process, and the newly added modules may correspond to the signal processing apparatus according to embodiments of the present disclosure, wherein response signal optimization can be performed based on relative perceptual characteristics, in particular using information related to mutual masking situations to remove redundant responses, and/or performing the response signal optimization based on absolute perceptual characteristics, in particular calculating perceptual channels as intensity-related information for further signal processing, so that an optimized set of pulse signals can be obtained for audio rendering.

Figure 4A:
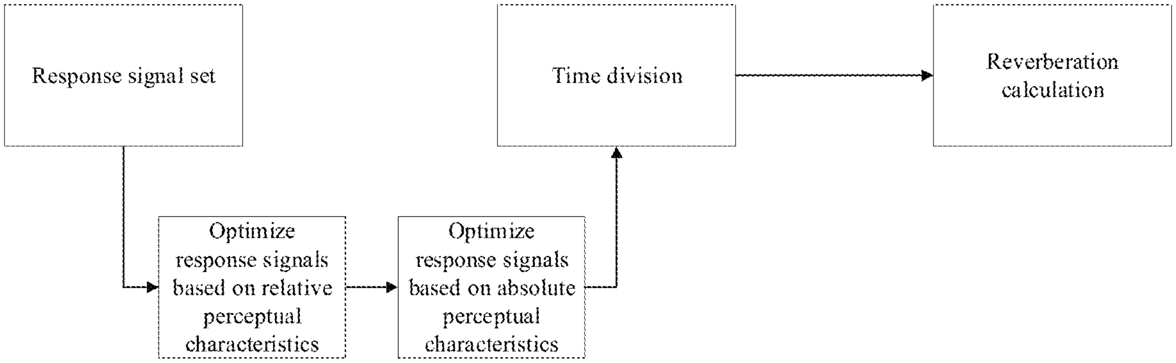
FIG. 4A shows a schematic diagram of an exemplary audio rendering process in accordance with some embodiments of the present disclosure.
Figure 4A:
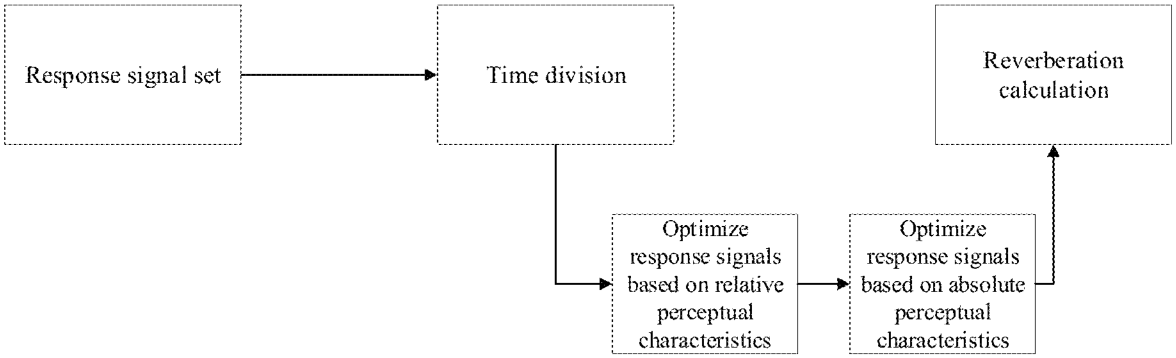
Figure 4A:
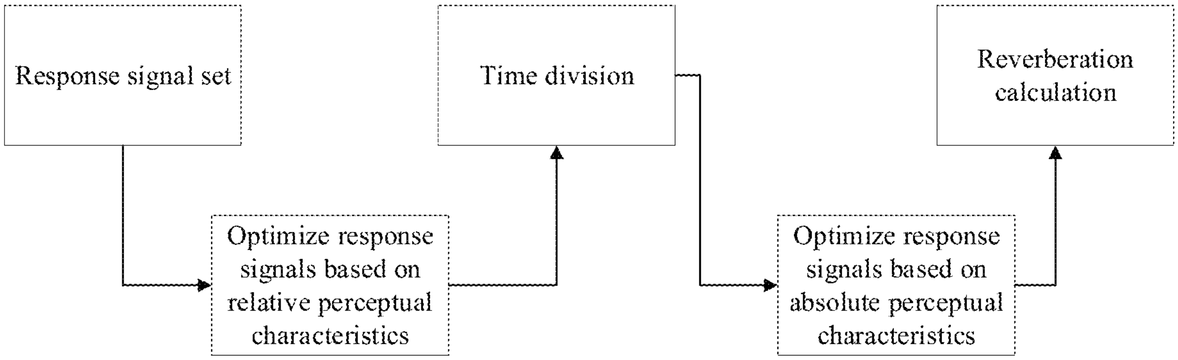

In other embodiments, signal processing according to embodiments of the present disclosure may be applied before block division. As shown at 402 in FIG. 4A, specifically, after acquiring the impact response set R, the signal processing according to the embodiments of the present disclosure may be applied to the impact responses in the impact response set R, in particular, the information related to mutual masking situation can be used to remove redundant responses, and/or, for impact responses, calculating perceptual channels as intensity-related information for further signal processing, for example, removing impact responses with intensity related information lowering a specific threshold, and then temporally block dividing the optimized pulse signal set thus obtained, and then performing audio rendering, such as calculating ARIR and optionally or additionally calculating BRIR, based on the response signals after block division.

In some embodiments, the signal processing according to embodiments of the present disclosure may be applied after block division. As shown at 404 in FIG. 4A, specifically, after the impact response set R is acquired and is subject to block division temporally, the signal processing according to the embodiments of the present disclosure may be applied to the impact responses in each time block, particularly, the information related to mutual masking situation can be used to remove redundant responses, and/or, for impact responses, calculating perceptual channels as intensity-related information for further signal processing, for example, removing impact responses with intensity related information lowering a specific threshold, thereby need to participate in reverberation calculation for audio rendering, so that an optimally processed set of pulse signals can be acquired for audio rendering, such as calculating ARIR and optionally or additionally calculating BRIR.

In still other embodiments, signal processing according to embodiments of the present disclosure may be distributed before and after time division. As shown at 406 in FIG. 4A, after acquiring the impact response set R, signal processing according to embodiments of the present disclosure can be applied to the impact responses in the impact response set R, particularly, the information related to mutual masking situation can be used to remove redundant responses, and then the processed impact responses can then be temporally block divided, then for each block of impact responses, calculating perceptual channels as intensity-related information for further signal processing, for example, removing impact responses with intensity related information lowering a specific threshold, thereby performing audio rendering based on the further processed signals, such as calculating ARIR and optionally or additionally calculating BRIR. It should be noted that in this decentralized implementation, the operation of removing redundant responses by means of the information related to mutual masking situation, and the operation of calculating perceptual channels as intensity-related information for further signal processing can be performed exchangeably, for example, perceptual channels can be calculated as intensity-related information before the block division, and the information related to mutual masking situation can be used to remove redundant responses after the block division.

Therefore, in the present disclosure, by judging whether the perceptual characteristics of the response signals meet the perceptual requirements, for example, whether the perceptual characteristics in the temporal dimension and/or the spatial dimensions meet the perceptual requirements, and performing processing, such as at least one of removing, ignoring, merging, etc. on the response signals that do not meet the requirements, which may be equivalent to psychoacoustic masking of response signals that do not meet the requirements, thereby reducing the number of impact responses while the performance of the algorithm still maintains high performance and high fidelity.

Figure 2B:
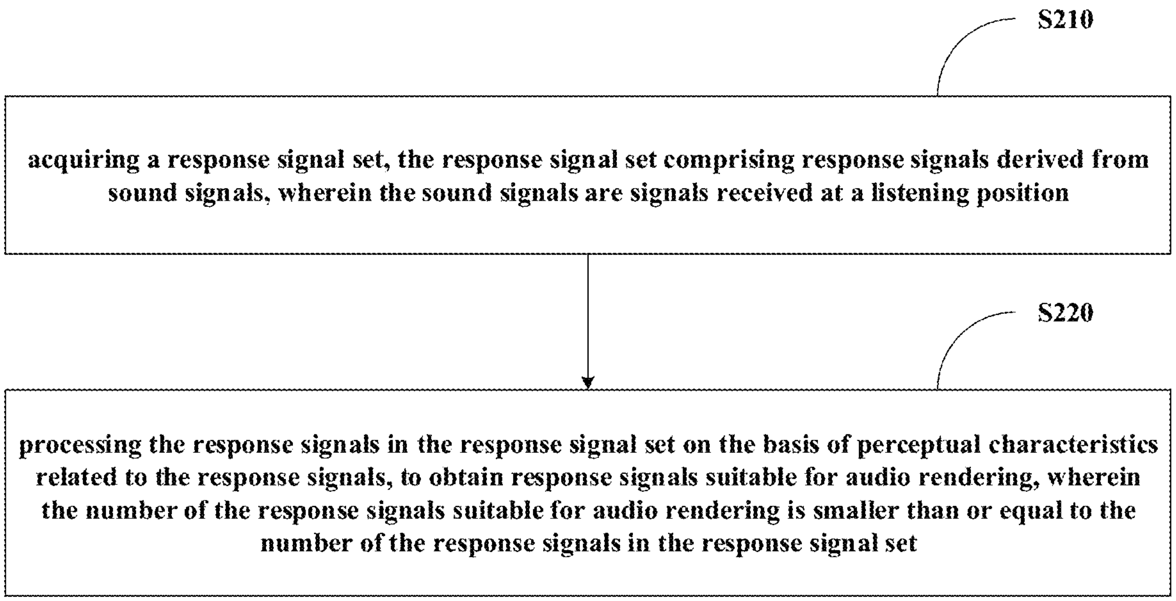
FIG. 2B illustrates a flowchart of a signal processing method for audio rendering according to some embodiments of the present disclosure.
Figure 2C:
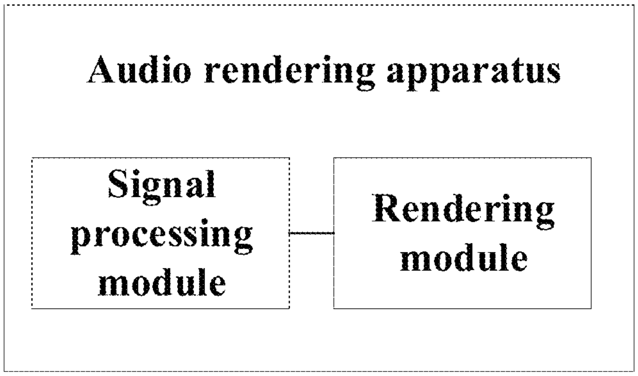
FIG. 2C shows a block diagram of an audio rendering apparatus according to some embodiments of the present disclosure.

According to some embodiments of the present disclosure, there is also provided an audio rendering apparatus, which includes a signal processing module as described herein and is configured to process response signals derived from sound signals from a sound source to a listening position; and a rendering module configured to perform audio rendering based on the processed response signals, as shown in FIG. 2C. In particular, the audio rendering can be implemented using various appropriate rendering operations known in the art, for example, various appropriate rendering signals can be obtained for rendering. As an example, for a more advanced scene information processor, the spatial room reverberation response that may generate the scene includes but is not limited to RIR (Room Impulse Response), ARIR (Ambisonics Room Impulse Response), BRIR (Binaural Room Impulse Response), MO-BRIR (Multi orientation Binaural Room Impulse Response). For this type of information, a convolver can be added into this module to obtain the processed signal. Depending on the type of reverberation, the result may be an intermediate signal (ARIR), an omnidirectional signal (RIR) or a binaural signal (BRIR, MO-BRIR).

In particular, according to embodiments of the present disclosure, the aforementioned processing of optimizing signals based on the absolute perceptual characteristics of the signals can also be implemented by the rendering module in the audio rendering apparatus. That is to say, in the audio rendering apparatus, for the response signals derived from the sound signals from the sound source to the listening position, the signal processing module optimizes the response signals based on the relative perceptual characteristics of the signals to obtain a reduced number of response signals, and then the rendering processing is performed on the reduced number of response signals in the rendering module, wherein further for the reduced number of response signals, the signal processing based on the absolute perceptual characteristics of the signals according to an embodiment of the present disclosure can be applied, in particular, only signals whose absolute perceptual characteristics are higher than a certain threshold are performed reverberation calculation for audio rendering, such as audio rendering through convolution, which can further reduce computational complexity, reduce computational overhead, and improve computational efficiency.

It should be noted that individual modules of the signal processing apparatus and the audio rendering apparatus as described above are only logical modules classified according to the specific functions they realize, and are not used to limit the specific implementation, for example, they can be implemented in software, hardware or a combination of software and hardware. In actual implementation, the above modules can be realized as independent physical entities, or can also be realized by a single entity (for example, a processor (CPU or DSP, etc.), an integrated circuit, etc.), for example, an encoder, a decoder, etc. can adopt a chip (such as an integrated circuit module including a single wafer), a hardware component or a complete product. In addition, the elements, when indicated by dotted lines in the drawings, may indicate that these elements may exist, but need not actually exist, the operations/functions they realize may be realized by processing circuit itself.

In addition, alternatively, the signal processing apparatus and the audio rendering apparatus may also include other components not shown, such as interface, memory, communication unit, and the like. As an example, the interface and/or communication unit may be used to receive an input audio signal to be rendered, or in response to a set of signals, and may also output the finally generated audio signals to a playback device in a playback environment for playback. As an example, the memory may store various data, information, programs, etc. used in audio rendering and/or generated during the audio rendering process. Memory may include, but not limited to, random access memory (RAM), dynamic random-access memory (DRAM), static random-access memory (SRAM), read only memory (ROM), and flash memory.

According to some embodiments of the present disclosure, a signal processing method for audio rendering is also proposed. FIG. 2B illustrates a flowchart of some embodiments of a signal processing method for audio rendering according to the present disclosure. As shown in FIG. 2B, in step S210 (acquisition step), acquiring a response signal set, the response signal set comprising response signals derived from sound signals, wherein the sound signals are signals received at a listening position, and in step S220 (processing step), processing the response signals in the response signal set on the basis of perceptual characteristics related to the response signals, to obtain response signals suitable for audio rendering, wherein the number of the response signals suitable for audio rendering is smaller than or equal to the number of the response signals in the response signal set.

Figure 2D:
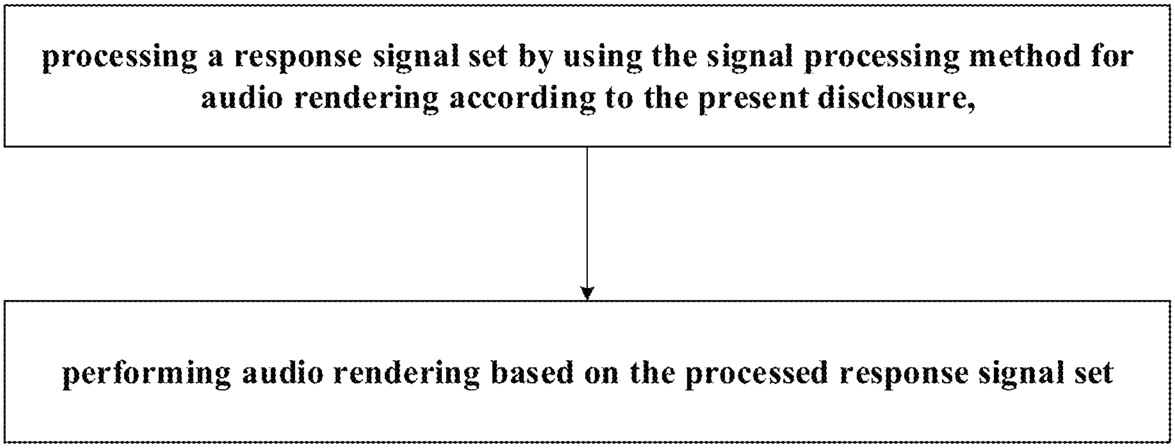
FIG. 2D illustrates a flowchart of an audio rendering method according to some embodiments of the present disclosure.

According to some embodiments of the present disclosure, an audio rendering method is also proposed, which includes processing response signals derived from sound signals from a sound source to a listening position by using the signal processing method as described herein, and performing audio rendering based on the processed response signals, as shown in FIG. 2D.

Although not shown, the signal processing method for audio rendering according to the present disclosure may also include other steps to implement the impulse response sorting, psychoacoustic masking characteristic acquisition, and comparison/decision processing as described above, which will not be described in detail here. It should be noted that the signal processing method and the audio rendering method according to the present disclosure and the steps therein can be executed by any appropriate device, such as a processor, an integrated circuit, a chip, etc., for example, can be executed by the aforementioned signal processing apparatus and respective modules thereof, the method can also be implemented by being embodied in a computer program, instructions, computer program media, computer program products, etc.

Figure 4B:
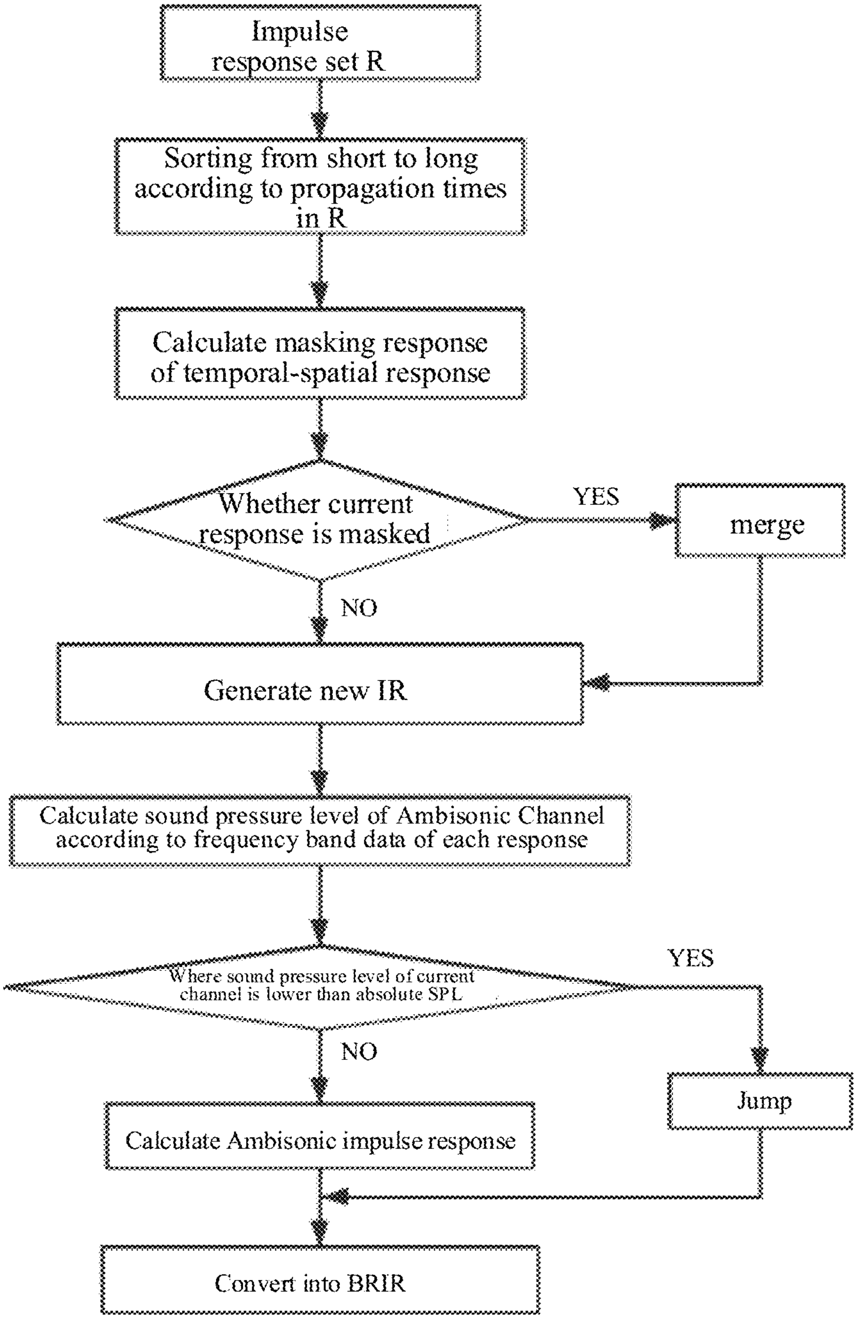
FIG. 4B illustrates a flowchart of example processing operations in accordance with some embodiments of the present disclosure.

Exemplary processing operations according to embodiments of the present disclosure will be described in detail below with reference to the accompanying drawings. FIG. 4B illustrates a flowchart of exemplary processing operations according to embodiments of the present disclosure, in which the sound signal processing can be performed based on both intensity-related information and signal masking situation information for audio rendering processing.

1. For the impulse response set R, sorting is performed according to the time in R to obtain the sorted set $R_{t,s}$, where the subscript t represents time and s represents space.

2. For a current response $r_{t,s}$, traverse its neighboring response set $$R^l_{t,s} = \{ \cdots , r_{t-1,s}, r_{t,s}, r_{t+1,s}, \cdots \}$$

one by one in time dimension, each $r_{t,s}$ includes three important data, such as time, spatial direction, and sound intensity. The neighboring response set here may be a response set within a specific time range including the current response, and l represents the length l of the neighboring response set, which may indicate the time range, or the number of responses need to be included in the neighboring response set, etc.

3. Calculate a cosine set for spatial vectors in the current set based on the neighboring response set $$R^l_{t,s}$$

as the aforementioned masking situation related information $$\{\zeta^l_{i,j}\} = \bigcup_{i=0}^{l} \bigcup_{\substack{j=0,\\ j\neq i}}^{l} \frac{\vec{r_i}\cdot\vec{r_j}}{|r_i||r_j|}$$

Among them, $\vec{r_i}$ and $\vec{r_j}$ represent vector representations of two responses in the neighboring response set $$R^l_{t,s},$$

the arrows added here indicate the direction, because each response has a directional coordinate value in space, which is equivalent to a vector, $|r_i|$, $|r_j|$ in the denominator respectively indicate the magnitudes of these two responses, for example, the sizes of vectors in a specific coordinate system. Thereby, the set of cosines between every two responses in the neighboring response set can be obtained.

4. Based on the set $$\{\zeta^l_{i,j}\}$$

and a spatial cosine threshold $\zeta_T$, it is judged whether masking occurs, and a new set $$R'_{t,s}$$

can be generated $$r'_{t,s} = \begin{cases} \dfrac{\overrightarrow{r_{i,s}} + \overrightarrow{r_{j,s}}}{2}, & \zeta^l_{i,j} > \zeta_T \\ \{\overrightarrow{r_{i,s}}, \overrightarrow{r_{j,s}}\}, & \text{others} \end{cases}$$

In particular, each value in the set $$\{\zeta^l_{i,j}\}$$

is compared with a specific threshold, and in a case that the value is greater than the threshold, the two responses corresponding to the value in the set $$\{\zeta_{i,j}^{l}\}$$

are merged, for example, the mean of the two impact responses is obtained, and it should be noted that other merging manners are also possible. For other cases, the two impact responses can remain. In this way, through merging, the impulse responses contained in the impulse response set can be reduced to obtain a new set.

5. Calculate the sound pressure level for a corresponding frequency band of the response according to the new set $$R'_{t,s},$$

as intensity-related information in the psychoacoustic perceptual characteristics. Here, the sound pressure level can be calculated for channels, especially the high-fidelity reverberation channel (Ambisonics channel).

Preferably, the computation of the sound pressure level can be performed for impulse response blocks, which are obtained by dividing the new set into blocks, and the block size can be set by using various appropriate methods. In some embodiments, the block size may correspond to the size of a head-related transfer function (HRTF) used in audio rendering. The sound pressure level is calculated as follows:

$$r'_{spl} = 20\log\left(\frac{\sqrt{z_0 \sum_0^n r'_{t,s}}}{P_{ref}}\right)$$

Preferably, in the sound pressure level, $Z_0$ represents the acoustic impedance, $$\sum_0^n r'_{t,s}$$

represents the sum of the sound pressures of each frequency band in each block, and $P_{ref}$ represents a reference sound pressure.

6. Calculate ARIR of the set $$R'_{t,s},$$

and judge whether to perform convolution calculation based on the SPL calculated in the previous step, to obtain $R_{arir}$ $$r_{arir} += \begin{cases} \text{convolver}(r'_{t,e}, hrtf_t), & r'_{spl} > spl_T \\ 0, & \text{others} \end{cases}$$

The convolution operation here can be implemented in various ways known in the art, and the selected hrtf function can be various appropriate functions known in the art, which will not be described in detail here. In this way, signals with high sound pressure intensity levels are retained, and convolution operations are performed to obtain ARIR of the responses, while convolution operations are not required for signals with low sound pressure levels. This can reduce computational overhead and improve computational efficiency.

7. Convert to corresponding $R_{brir}$ based on $R_{arir}$. The conversion operation here can employ various conversion methods known in the art, which will not be described in detail here.

Advantageous technical effects achieved by the optimization process according to embodiments of the present disclosure will be described below. This method can effectively reduce the number of impulse responses to be calculated, and the computational complexity and time consumption of binaural impulse responses.

Here the description will be presented by taking a spatial scenario sibenik and the order of Ambisonics being 3 as an example, wherein through spatial and temporal computations, a ratio of the number of impulse responses to be shielded/filtered out to the number of all impulse responses can be calculated, the computational formula is $$p_n = \frac{R_n - R_m}{R_n}$$

Among them, $R_m$ is the number of impulse responses to be shielded/filtered out, $R_n$ is the total number of impulse responses, and $P_n$ means the number of impulse responses to be shielded/filtered out and the total number of all impulse responses when the number of current impulse responses is n. Specifically, as the number of impulse responses increases, the number of impulse responses to be shielded/filtered out also increases. When the range of impulse responses is [1000, 10000], the portion of impulse responses to be shielded/filtered out is [1%, 17.5%].

As another example, through computation of the absolute hearing threshold, the ratio of the number of perceived channels below the absolute hearing threshold to the total number of channels can be obtained, the computational formula is:

$$p_n^c = \frac{R_n^c - R_m^c}{R_n^c}$$

Among them, $$R_m^c$$

is the number of perceived channels below the absolute hearing threshold, $$R_n^c$$

is the total number of channels, $$p_n^c$$

is the ratio of the number of perceived channels below the absolute hearing threshold and the total number of channels when the number of current impulse responses is i.

Specifically, as the number of impulse responses increases, the proportion of perceived responses below the absolute hearing threshold also increases. As an example, when the range of the impulse response is [1000, 10000], the proportion of perceived responses below the absolute hearing threshold is [50%, 70%].

By statistical analysis of time-consuming performance for 1000 impulse response and various high-fidelity reverberation orders, the ratio of the optimized time-consuming performance to the time-consuming performance of the original method can be obtained, the computational formula is as follows:

$$p_n^t = \frac{R_n^t - RC_n^t}{R_n^t}$$

Among them, $$R_n^t$$

indicates the computation time of the original method when the order is n, $$RC_n^t$$

indicates the computation time after spatial and temporal absolute threshold perception, $$p_n^t$$

is the ratio of the time saved to the time consumed by the original method.

As an example, when the order of high-fidelity reverberation is in the range [3, 7], the computation time of BRIR in the sibenik scenario can be saved by [30%, 50%].

In summary, it can be seen that for the process of calculating the binaural room impulse response of late reverberation from the impulse response, the signal processing of the present disclosure will greatly reduce the computation time, thereby reducing the computation overhead and improving the computational efficiency.

Figure 5:
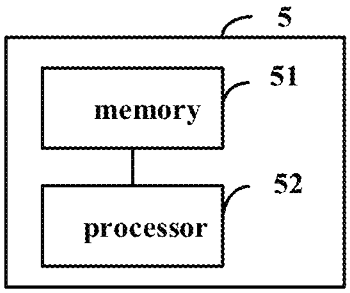
FIG. 5 shows a block diagram of some embodiments of the electronic device according to the present disclosure.

FIG. 5 shows a block diagram of some embodiments of the electronic device of the present disclosure.

As shown in FIG. 5, the electronic device 5 of this embodiment includes: a memory 51 and a processor 52 coupled to the memory 51. The processor 52 is configured to execute instructions stored in the memory 51, so as to implement audio processing method for audio rendering or the audio signal rendering method according to any embodiment of the present disclosure.

The memory 51 may include, for example, system memory, fixed non-volatile storage media, etc. The system memory stores, for example, operating systems, application programs, boot loaders, databases, and other programs.

Figure 6:
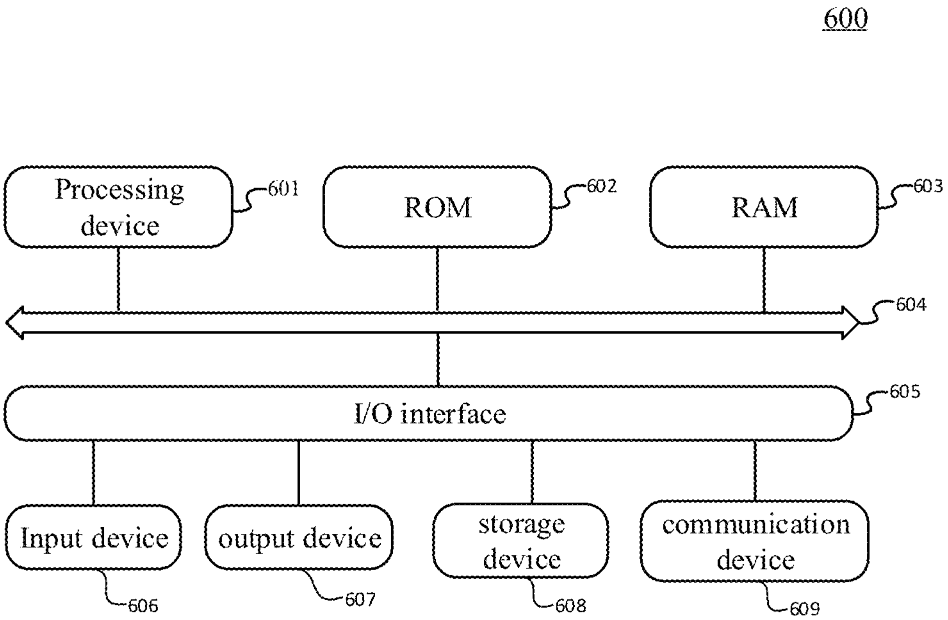
FIG. 6 illustrates a block diagram of other embodiments of the electronic device according to the present disclosure.

Referring now to FIG. 6, a schematic structural diagram of an electronic device suitable for implementing embodiments of the present disclosure is shown. The electronic device in embodiments of the present disclosure may include, but not limited to, mobile terminals such as mobile phones, laptops, digital broadcast receivers, PDAs (Personal Digital Assistants), PADs (Tablets), PMPs (Portable Multimedia Players), vehicle-mounted terminals (e.g., car navigation terminals), and fixed terminals such as digital TVs, desktop computers, etc. The electronic device shown in FIG. 6 is only an example and should not impose any limitations on the functions and scopes of usage of the embodiments of the present disclosure.

FIG. 6 shows a block diagram of further embodiments of electronic devices of the present disclosure.

As shown in FIG. 6, the electronic device may include a processing device (e.g., central processor, graphics processor, etc.) 601, which may perform various appropriate actions and processes according to a program stored in a read-only memory (ROM) 602 or loaded from a storage device 608 (RAM) into a random-access memory 603. In RAM 603, various programs and data required for the operation of the electronic device are also stored. The processing device 601, ROM 602 and RAM 603 are connected to each other via a bus 604. An input/output (I/O) interface 605 is also connected to bus 604.

Generally, the following devices may be connected to the I/O interface 605: an input device 606 including, for example, a touch screen, touch pad, keyboard, mouse, image sensor, microphone, accelerometer, gyroscope, etc.; an output device 607 including, for example, a liquid crystal display (LCD), speakers, a vibrator, etc.; a storage device 608 including a magnetic tape, a hard disk, etc.; and a communication device 609. The communication device 609 may allow the electronic device to communicate wirelessly or wiredly with other devices to exchange data. Although FIG. 6 illustrates an electronic device having various means, it should be understood that not all illustrated means need to be implemented or included. Alternatively, more or fewer means may be implemented or provided.

According to embodiments of the present disclosure, the processes described above with reference to the flowcharts may be implemented as a computer software program. For example, embodiments of the present disclosure include a computer program product including a computer program carried on a computer-readable medium, the computer program containing program codes for performing the method illustrated in the flowchart. In such embodiments, the computer program may be downloaded and installed from the network via communication device 609, or installed from storage device 608, or installed from ROM 602. When the computer program is executed by the processing device 601, the above functions defined in the method of the embodiment of the present disclosure can be implemented.

In some embodiments, there is also provided a chip, including: at least one processor and an interface, the interface is used to provide computer executable instructions to at least one processor, and the at least one processor is used to execute the computer executable instructions to implement the audio processing method for audio rendering or the audio signal rendering method according to any of the above embodiments.

Figure 7:
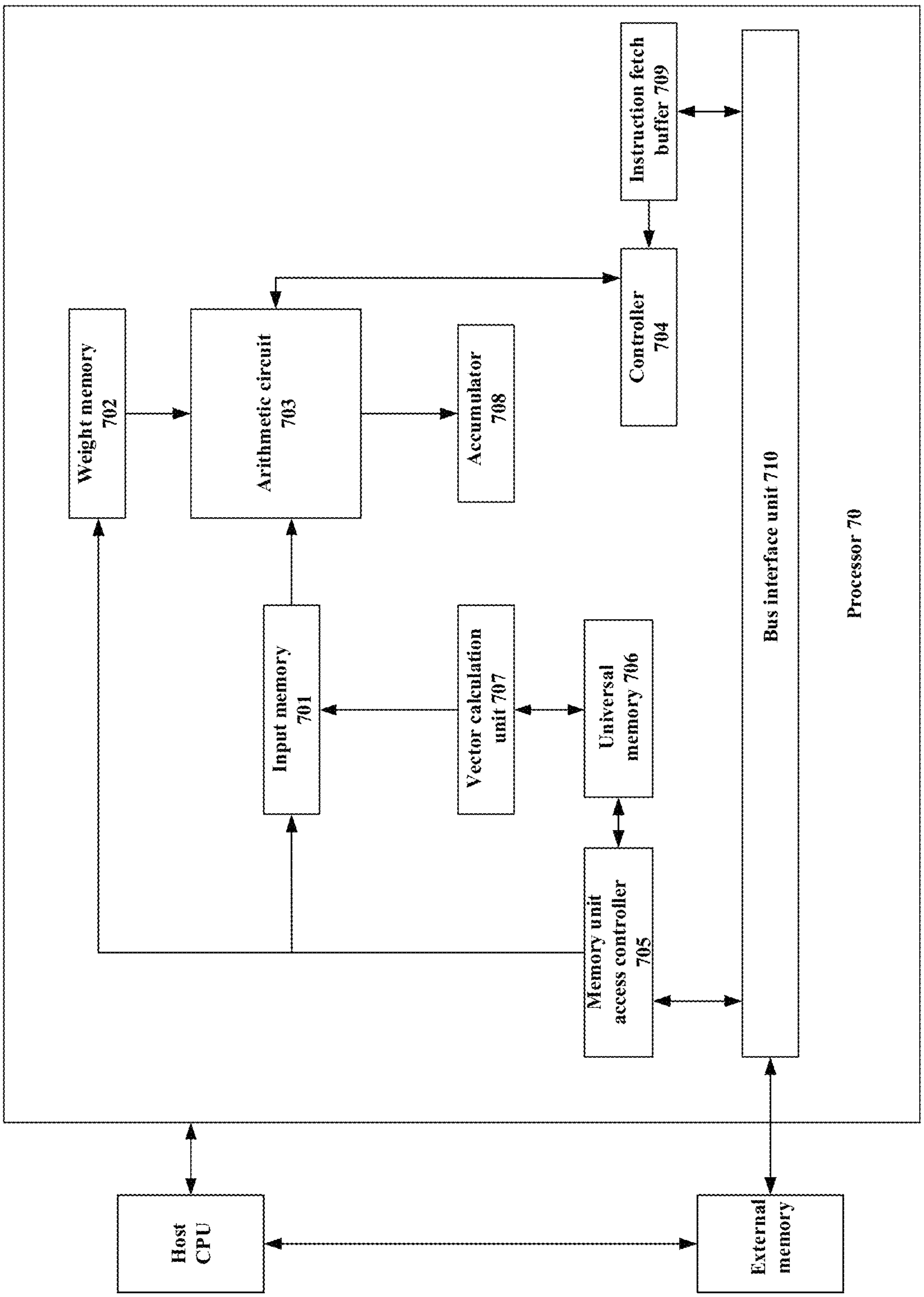
FIG. 7 shows a block diagram of some embodiments of the chip according to the present disclosure.

FIG. 7 shows a block diagram of some embodiments of the chip of the present disclosure.

As shown in FIG. 7, the processor 70 of the chip is mounted on the main CPU (Host CPU) as a co-processor, and the Host CPU allocates tasks. The core part of the processor 70 is an arithmetic circuit, and the controller 704 controls the arithmetic circuit 703 to extract data in the memory (weight memory or input memory) and perform operations.

In some embodiments, the computing circuit 703 internally includes multiple processing units (Process Engine, PE). In some embodiments, arithmetic circuit 703 is a two-dimensional systolic array. The arithmetic circuit 703 may also be a one-dimensional systolic array or other electronic circuit capable of performing mathematical operations such as multiplication and addition. In some embodiments, arithmetic circuit 703 is a general-purpose matrix processor.

For example, assume there is an input matrix A, a weight matrix B, and an output matrix C. The arithmetic circuit obtains corresponding data of matrix B from the weight memory 702 and caches it on each PE in the arithmetic circuit. The operation circuit takes matrix A data from the input memory 701 to perform matrix operations with matrix B, and the obtained partial result or final result of the matrix is stored in an accumulator 708.

The vector calculation unit 707 can further process the output of the operation circuit, such as vector multiplication, vector addition, exponential operation, logarithmic operation, size comparison, etc.

In some embodiments, the vector calculation unit 707 can store the processed output vector to the universal buffer 706. For example, the vector calculation unit 707 may apply a nonlinear function to the output of the operation circuit 703, such as a vector of accumulated values, to generate an activation value. In some embodiments, vector calculation unit 707 generates normalized values, merged values, or both. In some embodiments, the processed output vector can be used as an activation input to the arithmetic circuit 703, for example for use in a subsequent layer in a neural network.

The universal memory 706 may be used to store input data and output data.

A memory unit access controller 705 (Direct Memory Access Controller, DMAC) transports the input data in the external memory to the input memory 701 and/or the universal memory 706, stores the weight data in the external memory into the weight memory 702, and stores the data in the universal memory 706 into the external memory.

Bus Interface Unit (BIU) 510 is used to realize interaction among the main CPU, DMAC and fetch memory 709 through the bus.

An instruction fetch buffer 709 connected to the controller 704 is used for storing instructions used by the controller 704;

The controller 704 is used to call the instructions cached in the instruction fetch buffer 709 to control the working process of the operation accelerator.

Generally, the universal memory 706, the input memory 701, the weight memory 702 and the instruction fetch memory 709 are all On-Chip memories, and the external memory is the memory outside the NPU, the external memory can be Double Data Rate Synchronous Dynamic Random Access Memory (DDR SDRAM), High Bandwidth Memory (HBM), or other readable and writable memories.

In some embodiments, there may also provide a computer program, which comprises instructions which, when executed by a processor, cause the processor to implement the audio processing method for audio rendering or the audio signal rendering method according to any of the above embodiments.

It should be understood by those skilled in the art that the present disclosure can take the form of an entirely hardware embodiment, an entirely software embodiment, or an embodiment combining software and hardware aspects. When implemented in software, the above-mentioned embodiments can be implemented in the form of computer program products as a whole or in part. A computer program product includes one or more computer instructions or computer programs. When computer instructions or computer programs are loaded or executed on a computer, the processes or functions according to the embodiments of the present application can be generated as a whole or in part. The computer can be a general-purpose computer, a special-purpose computer, a computer network, or other programmable apparatuses. Furthermore, the present disclosure may take the form of a computer program product embodied on one or more computer-usable non-transitory storage media (including but not limited to disk storage, CD-ROM, optical storage, etc.) in which computer-usable program codes are contained.

Although some specific embodiments of the present disclosure have been described in detail through examples, it should be understood by those skilled in the art that the above examples are only for illustrative and are not intended to limit the scope of the present disclosure. It should be understood by those skilled in the art that the above embodiments can be modified without departing from the scope and spirit of the present disclosure. The scope of the present disclosure is defined by the appended claims.

What is claimed is:

1. A signal processing method for audio rendering, comprises:

acquiring a response signal set, the response signal set comprising response signals derived from sound signals, wherein the sound signals are signals received at a listening position;

sorting the response signals in the response signal set temporally or spatially; and processing the sorted response signals in the response signal set on a basis of perceptual characteristics related to the response signals, to obtain response signals suitable for audio rendering, wherein a number of the response signals suitable for audio rendering is smaller than or equal to a number of the response signals in the response signal set.

2. The signal processing method of claim 1, wherein the perceptual characteristics include relative perceptual characteristics between response signals, and the processing the sorted response signals in the response signal set on the basis of the perceptual characteristics related to the response signals comprises:

judging whether the relative perceptual characteristics between the response signals in the response signal set or a neighboring response signal set in the response signal set meet perceptual requirements, and when it is judged that the relative perceptual characteristics between the response signals do not meet the perceptual requirements, performing merging or removal for the response signals.

3. The signal processing method of claim 2, wherein the relative perceptual characteristics and the perceptual requirements are related to mutual masking situations between response signals, the judging whether the relative perceptual characteristics between the response signals in the response signal set or the neighboring response signal set in the response signal set meet perceptual requirements comprises:

acquiring relevant information about the mutual masking situations between every two response signals in the response signal set or the neighboring response signal set in the response signal set, and determining magnitudes of the mutual masking situations between every two response signals;

when it is judged that the relative perceptual characteristics between the response signals do not meet the perceptual requirements, performing merging or removal for the response signals comprises:

when the mutual masking situation between two response signals is large, merging the two response signals to obtain an updated response signal.

4. The signal processing method of claim 3, wherein the relevant information about the mutual masking situations between two response signals comprises information about spatial interval between the two response signals, wherein the information about spatial interval between the two response signals is determined based on at least one of time information, spatial information and intensity information of the two response signals, and it is indicated that the mutual masking situation between two response signals is large when the spatial interval between the two response signals is smaller than a certain interval threshold.

5. The signal processing method of claim 2, wherein the neighboring response signal sets in the response signal set include response signals in the response signal set with at least one of time interval, space interval or frequency domain interval between each other being smaller than a second proximity threshold.

6. The signal processing method of claim 2, wherein the relative perceptual characteristics between the response signals and the perceptual requirement are related to proximity between the response signals, wherein the proximity between response signals includes at least one of temporal proximity, spatial proximity, and frequency domain proximity, wherein the judging whether the relative perceptual characteristics between the response signals in the response signal set or the neighboring response signal set in the response signal set meet perceptual requirements comprises:

for each response signal in the response signal set or the neighboring response signal set in the response signal set, judging whether the proximity between the response signal and any other response signal in the response signal set or the neighboring response signal set in the response signal set is smaller than a first proximity threshold, when it is judged that the relative perceptual characteristics between the response signals do not meet the perceptual requirements, performing merging or removal for the response signals comprises:

when the proximity between two response signals is smaller than the first proximity threshold, merging the two response signals.

7. The signal processing method of claim 2, wherein the merging includes performing mathematical statistics on attribute information about the response signals as the attribute information of the merged response signal, wherein the performing mathematical statistics comprises averaging attribute information of the response signals, and wherein the attribute information about response signal comprises at least one of temporal information, spatial information and sound intensity information.

8. The signal processing method of claim 1, wherein the perceptual characteristics related to response signal comprises perceptual intensity characteristics of the response signal itself, wherein the perceptual intensity characteristics of the response signal itself comprises at least one of a sound pressure level of a sound signal corresponding to the response signal, and the ratio of the sound pressure level of the sound signal corresponding to the response signal based on a channel to a reference sound pressure level, and wherein the processing the response signals in the response signal set on the basis of perceptual characteristics related to the response signals comprise:

in a case where the perceptual intensity characteristics of a response signal itself is below a certain absolute perceptual threshold, not using the response signal for audio rendering.

9. An electronic device, comprising:

a memory storing instructions thereon, and a processor coupled to the memory, the processor is configured to execute the instructions to implement, acquiring a response signal set, the response signal set comprising response signals derived from sound signals, wherein the sound signals are signals received at a listening position;

sorting the response signals in the response signal set temporally or spatially; and processing the sorted response signals in the response signal set on a basis of perceptual characteristics related to the response signals, to obtain response signals suitable for audio rendering, wherein a number of the response signals suitable for audio rendering is smaller than or equal to a number of the response signals in the response signal set.

10. The electronic device of claim 9, wherein the perceptual characteristics include relative perceptual characteristics between response signals, and the processing the sorted response signals in the response signal set on the basis of the perceptual characteristics related to the response signals comprises:

judging whether the relative perceptual characteristics between the response signals in the response signal set or a neighboring response signal set in the response signal set meet perceptual requirements, and when it is judged that the relative perceptual characteristics between the response signals do not meet the perceptual requirements, performing merging or removal for the response signals.

11. The electronic device of claim 10, wherein the relative perceptual characteristics and the perceptual requirements are related to mutual masking situations between response signals, the judging whether the relative perceptual characteristics between the response signals in the response signal set or the neighboring response signal set in the response signal set meet perceptual requirements comprises:

acquiring relevant information about the mutual masking situations between every two response signals in the response signal set or the neighboring response signal set in the response signal set, and determining magnitudes of the mutual masking situations between every two response signals;

when it is judged that the relative perceptual characteristics between the response signals do not meet the perceptual requirements, performing merging or removal for the response signals comprises:

when the mutual masking situation between two response signals is large, merging the two response signals to obtain an updated response signal.

12. The electronic device of claim 11, wherein the relevant information about the mutual masking situations between two response signals comprises information about spatial interval between the two response signals, wherein the information about spatial interval between the two response signals is determined based on at least one of time information, spatial information and intensity information of the two response signals, and it is indicated that the mutual masking situation between two response signals is large when the spatial interval between the two response signals is smaller than a certain interval threshold.

13. The electronic device of claim 10, wherein the neighboring response signal sets in the response signal set include response signals in the response signal set with at least one of time interval, space interval or frequency domain interval between each other being smaller than a second proximity threshold.

14. The electronic device of claim 10, wherein the relative perceptual characteristics between the response signals and the perceptual requirement are related to proximity between the response signals, wherein the proximity between response signals includes at least one of temporal proximity, spatial proximity, and frequency domain proximity, wherein the judging whether the relative perceptual characteristics between the response signals in the response signal set or the neighboring response signal set in the response signal set meet perceptual requirements comprises:

for each response signal in the response signal set or the neighboring response signal set in the response signal set, judging whether the proximity between the response signal and any other response signal in the response signal set or the neighboring response signal set in the response signal set is smaller than a first proximity threshold, when it is judged that the relative perceptual characteristics between the response signals do not meet the perceptual requirements, performing merging or removal for the response signals comprises:

when the proximity between two response signals is smaller than the first proximity threshold, merging the two response signals.

15. The electronic device of claim 10, wherein the merging includes performing mathematical statistics on attribute information about the response signals as the attribute information of the merged response signal, wherein the performing mathematical statistics comprises averaging attribute information of the response signals, and wherein the attribute information about response signal comprises at least one of temporal information, spatial information and sound intensity information.

16. The electronic device of claim 9, wherein the perceptual characteristics related to response signal comprises perceptual intensity characteristics of the response signal itself, wherein the perceptual intensity characteristics of the response signal itself comprises at least one of a sound pressure level of a sound signal corresponding to the response signal, and the ratio of the sound pressure level of the sound signal corresponding to the response signal based on a channel to a reference sound pressure level, and wherein the processing the response signals in the response signal set on the basis of perceptual characteristics related to the response signals comprise:

in a case where the perceptual intensity characteristics of a response signal itself is below a certain absolute perceptual threshold, not using the response signal for audio rendering.

17. A non-transitory computer-readable storage medium with instructions stored thereon, wherein the instructions, when executed by a processor, causes the processor to implement:

acquiring a response signal set, the response signal set comprising response signals derived from sound signals, wherein the sound signals are signals received at a listening position;

sorting the response signals in the response signal set temporally or spatially; and processing the sorted response signals in the response signal set on a basis of perceptual characteristics related to the response signals, to obtain response signals suitable for audio rendering, wherein a number of the response signals suitable for audio rendering is smaller than or equal to a number of the response signals in the response signal set.

18. The non-transitory computer-readable storage medium of claim 17, wherein the perceptual characteristics include relative perceptual characteristics between response signals, and the processing the sorted response signals in the response signal set on the basis of the perceptual characteristics related to the response signals comprises:

judging whether the relative perceptual characteristics between the response signals in the response signal set or a neighboring response signal set in the response signal set meet perceptual requirements, and when it is judged that the relative perceptual characteristics between the response signals do not meet the perceptual requirements, performing merging or removal for the response signals.

19. The non-transitory computer-readable storage medium of claim 17, wherein the perceptual characteristics related to response signal comprises perceptual intensity characteristics of the response signal itself, wherein the perceptual intensity characteristics of the response signal itself comprises at least one of a sound pressure level of a sound signal corresponding to the response signal, and the ratio of the sound pressure level of the sound signal corresponding to the response signal based on a channel to a reference sound pressure level, and wherein the processing the response signals in the response signal set on the basis of perceptual characteristics related to the response signals comprise:

in a case where the perceptual intensity characteristics of a response signal itself is below a certain absolute perceptual threshold, not using the response signal for audio rendering.

* * * * *